(12) United States Patent
Nakanishi et al.

(10) Patent No.: US 11,328,680 B2
(45) Date of Patent: May 10, 2022

(54) IMAGE PROCESSING DEVICE AND LIQUID CRYSTAL DISPLAY DEVICE

(71) Applicants: Panasonic Liquid Crystal Display Co., Ltd., Himeji (JP); Pasona Knowledge Partner Inc., Osaka (JP)

(72) Inventors: Hideyuki Nakanishi, Osaka (JP); Katsuhiro Kikuchi, Osaka (JP); Takenobu Nishiguchi, Nara (JP); Tatsuo Itoman, Osaka (JP)

(73) Assignees: PANASONIC LIQUID CRYSTAL DISPLAY CO., LTD., Hyogo (JP); PASONA KNOWLEDGE PARTNER INC., Osaka (JP)

( * ) Notice: Subject to any disclaimer, the term of this patent is extended or adjusted under 35 U.S.C. 154(b) by 0 days.

(21) Appl. No.: 17/096,418

(22) Filed: Nov. 12, 2020

(65) Prior Publication Data

US 2021/0193061 A1    Jun. 24, 2021

(30) Foreign Application Priority Data

Dec. 24, 2019  (JP) .............................. JP2019-232535

(51) Int. Cl.
*G09G 3/36* (2006.01)

(52) U.S. Cl.
CPC ... *G09G 3/3607* (2013.01); *G09G 2320/0276* (2013.01)

(58) Field of Classification Search
CPC ...................... G09G 3/3607; G09G 2320/0276
See application file for complete search history.

(56) References Cited

U.S. PATENT DOCUMENTS

| 2009/0147186 A1 | 6/2009 | Nakai et al. |
| 2020/0193926 A1* | 6/2020 | Koudo .................... G09G 3/003 |

FOREIGN PATENT DOCUMENTS

WO    2007/040127    4/2007

* cited by examiner

*Primary Examiner* — Kenneth B Lee, Jr.
(74) *Attorney, Agent, or Firm* — Hamre, Schumann, Mueller & Larson, P.C.

(57) ABSTRACT

An image processing device that generates a second output image signal output to a second liquid crystal panel that is disposed to be superposed on a first liquid crystal panel, includes: a first corrector that generates a gamma correction signal in which a gradation value of an input image signal is corrected; a detector that receives the gamma correction signal and detects an image region brighter than surroundings as a first high-frequency portion from the gamma correction signal; and a second corrector that receives the gamma correction signal and a detection result of the detector and performs correction to decrease the gradation value of the first high-frequency portion in the gamma correction signal. The second output image signal is generated based on the gamma correction signal corrected by the second corrector.

12 Claims, 16 Drawing Sheets when the pattern is small (a)  (b)

when the pattern is large (a)  (b)

IMAGE PROCESSING DEVICE AND LIQUID CRYSTAL DISPLAY DEVICE

CROSS-REFERENCE TO RELATED APPLICATION

This application claims priority from Japanese application JP 2019-232535, filed on Dec. 24, 2019. This Japanese application is incorporated herein by reference.

TECHNICAL FIELD

The present invention relates to an image processing device and a liquid crystal display device.

BACKGROUND

Liquid crystal display devices employing a liquid crystal panel can display images with low power consumption, and thus are utilized as displays, such as televisions or monitors, for example. However, liquid crystal display devices have low contrast ratios, as compared to organic electro luminescent (EL) display devices.

Thus, a liquid crystal display device is proposed in which liquid crystal panels are overlaid one on top of another to allow display of an image having a contrast ratio that is comparable to or more than organic EL display devices. For example, International publication. No. 2007/040127 discloses an image display device which achieves an improved contrast ratio by overlaying a first liquid crystal panel which displays a color image and a second liquid crystal panel which displays a monochrome image.

SUMMARY

However, in the liquid crystal display device disclosed in WO 2007/040127, sometimes image quality is degraded when an image having a predetermined display pattern is displayed. For example, when the liquid crystal display device disclosed in WO 2007/040127 displays the image of the display pattern having a bright portion such as a character on a black background, sometimes the image quality is degraded due to appearance of a halo and a double image.

The present disclosure provides an image display device and a liquid crystal display device capable of preventing the degradation of the image quality.

An image processing device according to a present disclosure generates a second output image signal output to a second liquid crystal panel of a liquid crystal display device including a first liquid crystal panel and the second liquid crystal panel that is disposed to be superposed on the first liquid crystal panel. The image processing device includes: a first corrector that generates a gamma correction signal in which a gradation value of an input image signal is corrected; a detector that receives the gamma correction signal and detects an image region brighter than surroundings as a first high-frequency portion from the gamma correction signal; and a second corrector that receives the gamma correction signal and a detection result of the detector and performs correction to decrease the gradation value of the first high-frequency portion in the gamma correction signal. The second output image signal is generated based on the gamma correction signal corrected by the second corrector.

A liquid crystal display device according to a present disclosure includes: the image processing device disclosed above; and the second liquid crystal panel to which the second output image signal generated by the image processing device is input.

DETAILED DESCRIPTION

Figure 1:
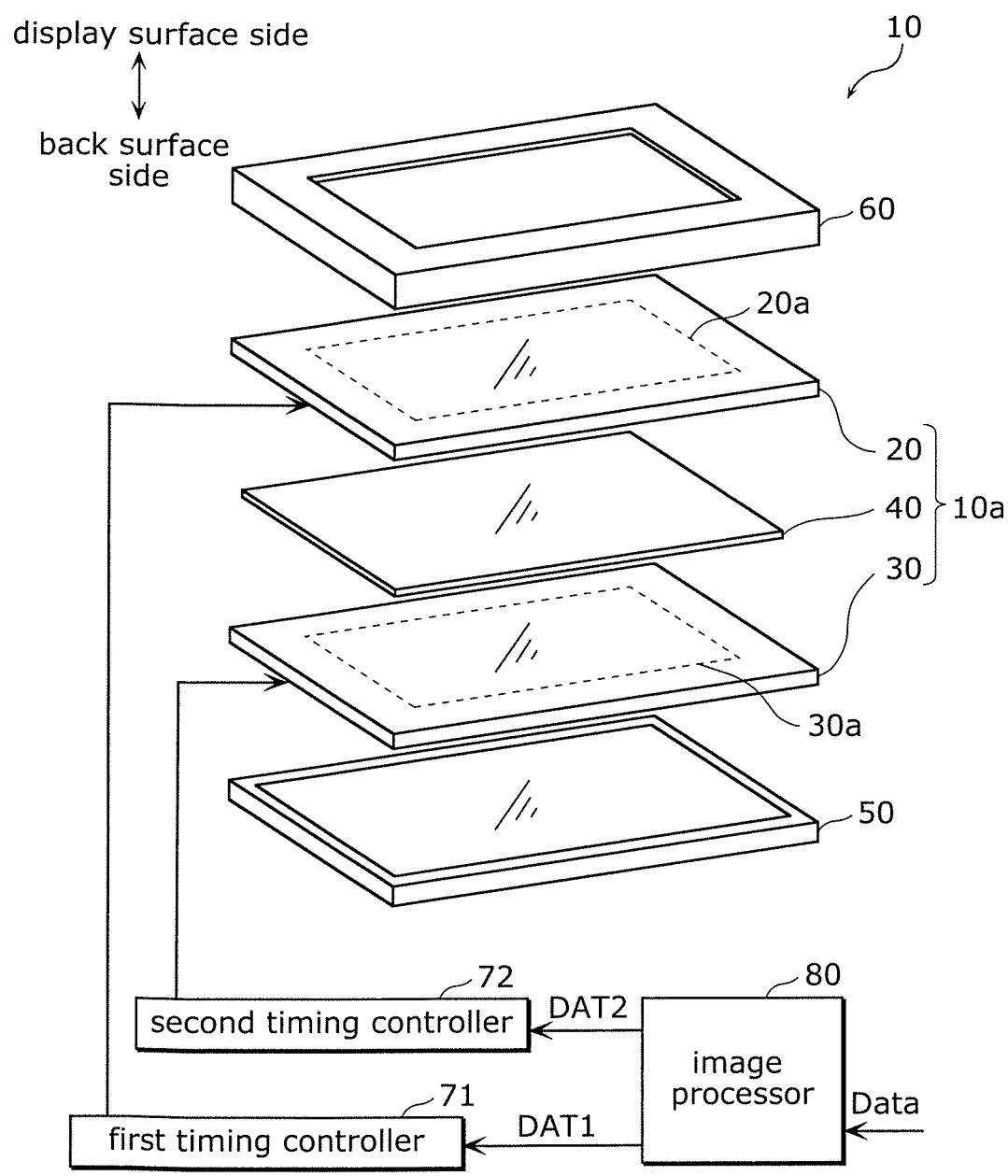
FIG. 1 is an exploded perspective view illustrating a liquid crystal display device according to a first exemplary embodiment.

Knowledge Forming Basis of the Present Disclosure

Knowledge forming a basis of the present disclosure will be described prior to the description of embodiments of the present disclosure.

In a liquid crystal display device having a configuration in which a plurality of liquid crystal panels (for example, a first liquid crystal panel and a second liquid crystal panel) are superposed on each other, parallax reduction processing is performed to prevent a parallax due to a gap between the first liquid crystal panel and the second liquid crystal panel. For example, the parallax reduction processing is performance of low-pass filtering processing such as MAX filtering processing on a signal output to the second liquid crystal panel. Consequently, degradation of image quality due to the parallax can be prevented.

In the liquid crystal display device, when an image of a display pattern having a bright portion such as a character on a black background is displayed, a halo, a double image, or the like is visually recognized, which sometimes results in the degradation of the image quality. When the bright portion has high luminance, the halo, the double image, or the like is significantly visually recognized with decreasing luminance of the bright portion because the surrounding dark portion is hardly seen due to a characteristic of human eye's contrast sensitivity.

For this reason, in the parallax reduction processing, reduction of a filter size is studied. The reduction of the filter size can prevent the halo, the double image, or the like from being visually recognized.

However, when the filter size is reduced in the parallax reduction processing, sometimes picture lacking in which a part of an end of a display pattern such as a character appears dark is generated in viewing the image from an oblique direction. The generation of the picture lacking can be prevented by increasing the filter size in the parallax reduction processing.

As described above, in the conventional liquid crystal display device, the prevention of the halo or the like is hardly compatible with the prevention of the picture lacking. For this reason, the inventors have made intensive studies on the compatibility between the prevention of the halo or the like and the prevention of the picture lacking, namely, the prevention of the degradation of the image quality, and devised the following image processing device and liquid crystal display device.

Hereinafter, exemplary embodiments and the like will be described with reference to the drawings. The following exemplary embodiments provide comprehensive or specific examples of the present disclosure. Numerical values, shapes, materials, components, disposition positions of the components, connection modes of the components, steps, and order of the steps that are illustrated in the following exemplary embodiments are examples, and therefore are not intended to limit the present disclosure. Among the components in the following exemplary embodiments, the components that are not recited in the independent claims indicating the broadest concept are described as an optional component.

In the specification, the term, such as orthogonal, which indicates a relationship between elements, the term, such as rectangular, which indicates a shape of the element, a numerical value, and a numerical range are not equation of only a strict meaning, but equation of a meaning including a substantially equivalent range, for example, a difference of about several percent.

The drawings are schematic diagrams, and not necessarily strictly illustrated. In the drawings, substantially the same configuration is designated by the same reference numerals, and overlapping description will be omitted or simplified.

First Exemplary Embodiment

Liquid crystal display device 10 according to a first exemplary embodiment will be described below with reference to FIGS. 1 to 8.

1-1. Configuration of Liquid Crystal Display Device

Figure 2:
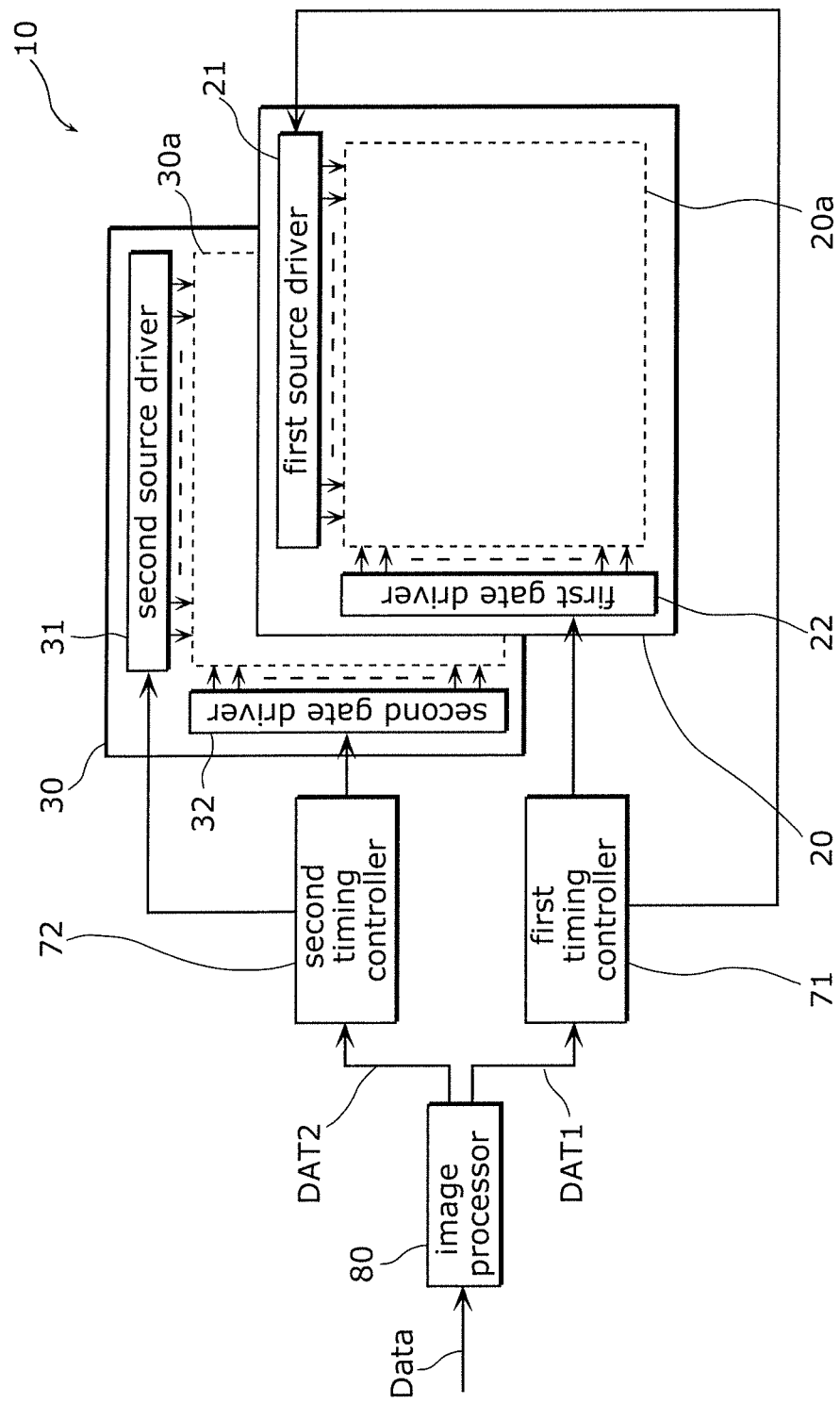
FIG. 2 is a view illustrating a schematic configuration of the liquid crystal display device of the first exemplary embodiment.
Figure 3:
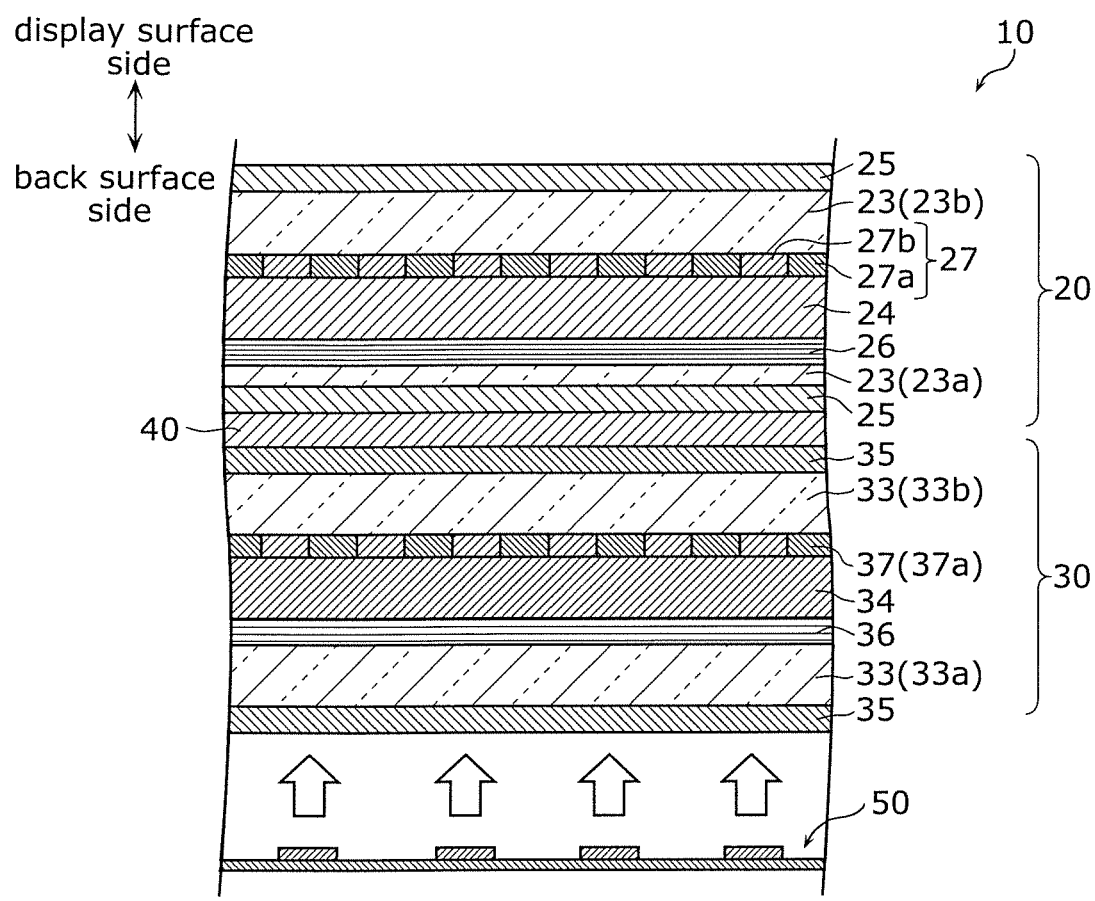
FIG. 3 is a partially enlarged sectional view illustrating the liquid crystal display device of the first exemplary embodiment.

A schematic configuration of whole liquid crystal display device 10 of the first exemplary embodiment will be described with reference to FIGS. 1 to 3. FIG. 1 is an exploded perspective view illustrating liquid crystal display device 10 of the first exemplary embodiment. FIG. 2 is a view illustrating a schematic configuration of liquid crystal display device 10 of the first exemplary embodiment. FIG. 2 illustrates a configuration of drivers of first liquid crystal panel 20 and second liquid crystal panel 30 in liquid crystal display device 10.

As illustrated in FIG. 1, liquid crystal display device 10 includes first liquid crystal panel 20 disposed at a position (front side) closer to the observer, second liquid crystal panel 30 disposed at a position (rear side) farther from the observer than first liquid crystal panel 20, adhesive layer 40 bonding first liquid crystal panel 20 and second liquid crystal panel 30, backlight 50 disposed on a back surface side (rear side) of second liquid crystal panel 30, and front chassis 60 covering first liquid crystal panel 20 and second liquid crystal panel 30 from an observer side.

First liquid crystal panel 20 and second liquid crystal panel 30 bonded together by adhesive layer 40 constitute liquid crystal display unit 10a (liquid crystal module), and are fixed to a middle frame (not illustrated) and a rear frame (not illustrated) together with backlight 50. Liquid crystal display unit 10a is an example of the display unit including first liquid crystal panel 20 and second liquid crystal panel 30 that is disposed while superposed on first liquid crystal panel 20 on the back surface side of first liquid crystal panel 20.

First liquid crystal panel 20 is a main panel that displays an image visually recognized by a user. In the first exemplary embodiment, first liquid crystal panel 20 displays a color image. On the other hand, second liquid crystal panel 30 is a sub-panel disposed on the back surface side of first liquid crystal panel 20. In the first exemplary embodiment, second liquid crystal panel 30 displays a monochrome image (black-and-white image) of an image pattern corresponding to the color image displayed on first liquid crystal panel 20 in synchronization with the color image.

For example, liquid crystal driving systems of first liquid crystal panel 20 and second liquid crystal panel 30 may be a lateral electric field system such as an IPS system or an FFS system. First liquid crystal panel 20 and second liquid crystal panel 30 are a normally black type in which white is displayed during a voltage applied state while black is displayed during a voltage non-applied state.

For example, the thickness of adhesive layer 40 is less than or equal to 0.5 mm. The thickness of adhesive layer 40 is set less than or equal to 0.5 mm, which allows the generation of the parallax to be prevented.

As illustrated in FIG. 2, first source driver 21 and first gate driver 22 are provided in first liquid crystal panel 20 in order to display the color image corresponding to the input image signal on first image display region 20a.

On the other hand, second source driver 31 and second gate driver 32 are provided in second liquid crystal panel 30 in order to display the monochrome image corresponding to the input image signal on second image display region 30a.

As illustrated in FIG. 1, backlight 50 is a surface light source that emits light toward first liquid crystal panel 20 and second liquid crystal panel 30. For example, backlight 50 is a light emitting diode (LED) backlight in which the LED is used as a light source. However, backlight 50 is not limited to the LED backlight. In the first exemplary embodiment, backlight 50 is a direct under type. Alternatively, backlight 50 may be an edge type. Backlight 50 may include an optical member such as a diffusion plate (diffusion sheet) that diffuses the light emitted from the light source.

Front chassis 60 is a front frame disposed on the observer side (front side). For example, front chassis 60 is a rectangular frame body. Preferably, front chassis 60 may be made of a metallic material, such as a steel sheet and an aluminum sheet, which has high rigidity, and may be made of a resin material.

As illustrated in FIG. 2, liquid crystal display device 10 includes first timing controller 71 that controls first source driver 21 and first gate driver 22 of first liquid crystal panel 20, second timing controller 72 that controls second source driver 31 and second gate driver 32 of second liquid crystal panel 30, and image processor 80 that outputs the image data to first timing controller 71 and second timing controller 72.

Image processor 80 receives input image signal Data transmitted from an external system (not illustrated), performs predetermined image processing on input video signal Data, outputs first output image signal DAT1 to first timing controller 71, and outputs second output image signal DAT2 to second timing controller 72. Image processor 80 also outputs a control signal (not illustrated) such as a synchronizing signal to first timing controller 71 and second timing controller 72. First output image signal DAT1 is image data used to display the color image, and second output image signal DAT2 is image data used to display the monochrome image. Image processor 80 is an example of an image processing device.

In liquid crystal display device 10 of the first exemplary embodiment, the image is displayed while two display panels of, first liquid crystal panel 20 and second liquid crystal panel 30 are superimposed on each other, so that black can be tightened. Consequently, the image having a high contrast ratio can be displayed. For example, liquid crystal display device 10 is a high dynamic range (HDR) compatible television, and a local dimming compatible direct-under type LED backlight may be used as backlight 50. In this case, the color image having the higher contrast ratio and higher image quality can be displayed.

In the first exemplary embodiment, first liquid crystal panel 20 displays the color image in first image display region 20a, and second liquid crystal panel 30 displays the black-and-white image in second image display region 30a. However, the present disclosure is not limited thereto. Alternatively, for example, first liquid crystal panel 20 may display the black-and-white image in first image display region 20a, and second liquid crystal panel 30 may display the color image in second image display region 30a. For example, both first liquid crystal panel 20 and second liquid crystal panel 30 may display the color image or the black-and-white image.

The detailed configuration of liquid crystal display device 10 will be described with reference to FIG. 3. FIG. 3 is an enlarged sectional view illustrating liquid crystal display device 10 of the first exemplary embodiment.

First liquid crystal panel 20 will be described. As illustrated in FIG. 3, first liquid crystal panel 20 includes a pair of first transparent substrates 23, first liquid crystal layer 24, and a pair of first polarizing plates 25.

For example, first transparent substrates 23 are a glass substrate, and are disposed opposite to each other. In the first exemplary embodiment, first transparent substrate 23 located on the second liquid crystal panel 30 side in the pair of first transparent substrates 23 is first TFT substrate 23a that is a thin film transistor (TFT) substrate on which a TFT and the like are formed, and first transparent substrate 23 located on the side opposite to the second liquid crystal panel 30 side in the pair of first transparent substrates 23 is first counter substrate 23b.

First TFT layer 26 on which the TFT or a wiring is provided is formed on a surface of first TFT substrate 23a on the first liquid crystal layer 24 side. A pixel electrode used to apply voltage to first liquid crystal layer 24 is formed on a planarization layer of first TFT layer 26. In the first exemplary embodiment, because first liquid crystal panel 20 is driven by the IPS system, not only the pixel electrode but also the counter electrode are formed on first TFT substrate 23a. The TFT, the pixel electrode, and the counter electrode are formed in each pixel. An alignment film is formed so as to cover the pixel electrode and the counter electrode.

First counter substrate 23b is a color filter substrate (CF substrate) on which color filter 27b is formed, and first pixel formation layer 27 including first black matrix 27a and color filter 27b is formed on the surface of the first counter substrate 23b on the first liquid crystal layer 24 side.

First liquid crystal layer 24 is sealed between the pair of first transparent substrates 23. A liquid crystal material for first liquid crystal layer 24 can appropriately be selected according to the driving system. For example, the thickness of first liquid crystal layer 24 ranges from 2.5 μm to 6 μm, but is not limited thereto.

First pixel formation layer 27 is disposed between the pair of first transparent substrates 23. That is, first black matrix 27a and color filter 27b are disposed between the pair of first transparent substrates 23. A plurality of first openings having a matrix form and constituting pixels are formed in first black matrix 27a. That is, each of the plurality of first openings corresponds to each of the plurality of pixels. For example, first black matrix 27a is formed into a lattice shape such that each first opening has a rectangular shape in planar view.

Color filter 27b is formed in the first opening of first black matrix 27a. For example, color filter 27b is constructed with a red color filter, a green color filter, and a blue color filter. The color filter of each color corresponds to each pixel.

A pair of first polarizing plates 25 is a sheet-shaped polarizing film made of a resin material, and is disposed such that the pair of first transparent substrates 23 is sandwiched between the pair of first polarizing plates 25. The pair of first polarizing plates 25 is disposed such that polarization directions of first polarizing plates 25 are orthogonal to each other. That is, the pair of first polarizing plates 25 is disposed in a crossed Nicol state. For example, the thickness of each of the pair of first polarizing plates 25 ranges from 0.05 mm to 0.5 mm, but is not limited thereto.

Second liquid crystal panel 30 will be described below. The second liquid crystal panel 30 includes a pair of second transparent substrates 33, second liquid crystal layer 34, and a pair of second polarizing plates 35.

For example, second transparent substrates 33 are a glass substrate, and disposed opposite to each other. In the first exemplary embodiment, second transparent substrate 33 located on the side of backlight 50 in the pair of second transparent substrates 33 is second TFT substrate 33a, and second transparent substrate 33 located on the side of first liquid crystal panel 20 of the pair of second transparent substrates 33 is second counter substrate 33b. Second TFT substrate 33a has the same configuration as first TFT substrate 23a of first liquid crystal panel 20. Thus, second TFT layer 36 is formed on the surface of the second TFT substrate 33a on the second liquid crystal layer 34 side, and the pixel electrode and the counter electrode are formed in each pixel on the planarization layer of second TFT layer 36.

Second pixel formation layer 37 including second black matrix 37a is formed on the surface of second counter substrate 33b on the second liquid crystal layer 34 side.

Second liquid crystal layer 34 is sealed between the pair of second transparent substrates 33. For example, the thickness of the second liquid crystal layer 34 ranges from 2.5 μm to 6 μm, but is not limited thereto.

Second pixel formation layer 37 is disposed between the pair of second transparent substrates 33. That is, second black matrix 37a is disposed between the pair of second transparent substrates 33. A plurality of second openings having a matrix form and constituting the pixels are formed in second black matrix 37a. That is, each of the plurality of second openings corresponds to each of the plurality of pixels. For example, second black matrix 37a is formed into a lattice shape such that each second opening has a rectangular shape in planar view.

A pair of second polarizing plates 35 is a sheet-shaped polarizing film made of a resin material, and is disposed such that the pair of second transparent substrates 33 is sandwiched between the pair of second polarizing plates 35. That is, the pair of second polarizing plates 35 is disposed in the crossed Nicol state. For example, the thickness of each of the pair of second polarizing plates 35 ranges from 0.05 mm to 0.5 mm, but is not limited thereto.

Figure 4:
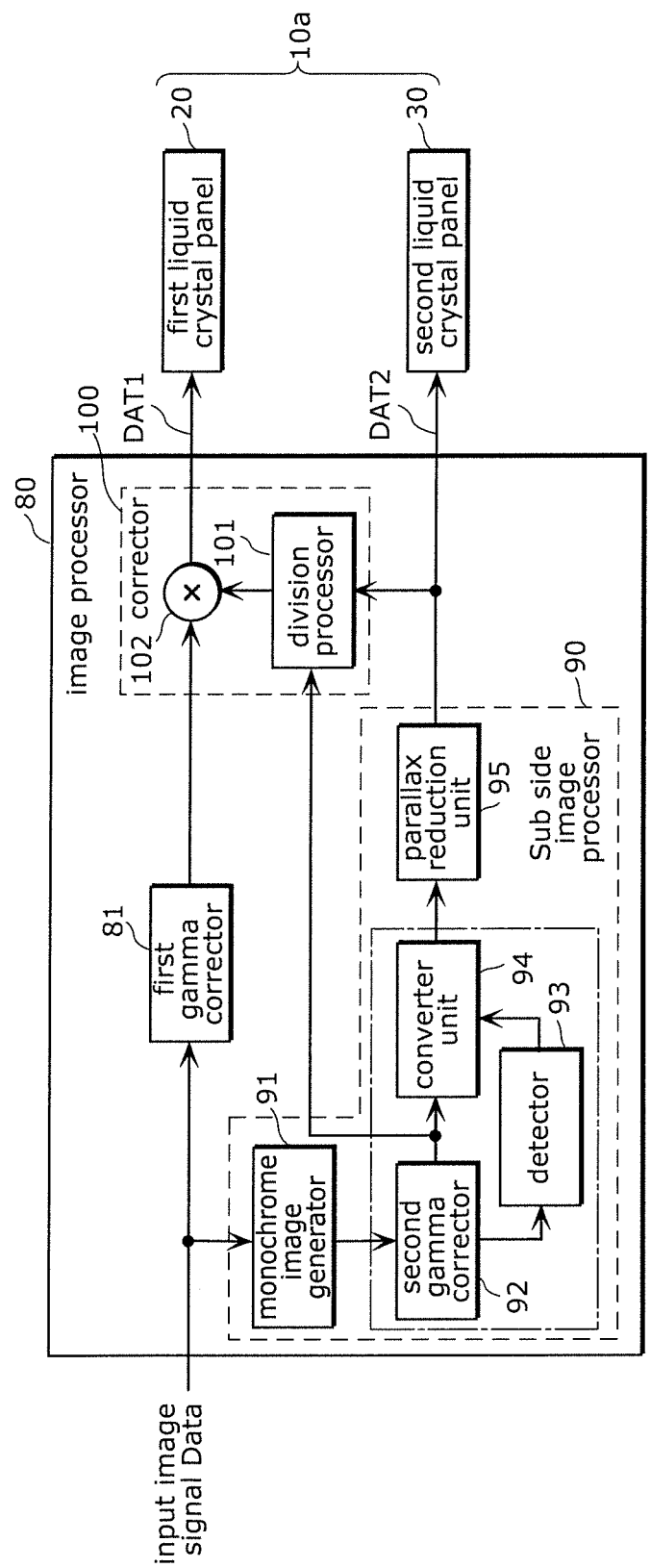
FIG. 4 is a block diagram illustrating a functional configuration of an image processor of the first exemplary embodiment.

The configuration of image processor 80 will be described below with reference to FIG. 4. FIG. 4 is a block diagram illustrating a functional configuration of image processor 80 of the first exemplary embodiment.

As illustrated in FIG. 4, image processor 80 generates first output image signal DAT1 output to first liquid crystal panel 20 and second output image signal DAT2 output to second liquid crystal panel 30 based on input image signal Data. For example, first output image signal DAT1 is input to first liquid crystal panel 20 without performing additional signal processing on first output image signal DAT1. For example, second output image signal DAT2 is input to second liquid crystal panel 30 without performing additional signal processing on second output image signal DAT2.

Image processor 80 includes first gamma corrector 81, black-and-white image generator 91, second gamma corrector 92, detector 93, converter 94, parallax reduction unit 95, and corrector 100. Black-and-white image generator 91, second gamma corrector 92, detector 93, converter 94, and parallax reduction unit 95 constitute sub-side image processor 90 that generates second output image signal DAT2 output to second liquid crystal panel 30. Image processor 80 needs to include at least sub-side image processor 90. In FIG. 4 and the subsequent drawings, first timing controller 71, second timing controller 72, and the like are not illustrated for convenience.

First gamma corrector 81 and second gamma corrector 92 perform predetermined gradation conversion on an input signal. First gamma corrector 81 performs the gradation conversion in order to generate first output image signal DAT1. First gamma corrector 81 performs the gradation conversion of input image signal Data such that a combined luminance characteristic of first liquid crystal panel 20 and second liquid crystal panel 30 becomes desired gamma. For example, first gamma corrector 81 corrects a gradation value of input image signal Data according to a gamma characteristic of first liquid crystal panel 20. Hereinafter, the signal in which the gradation is converted by first gamma corrector 81 is also referred to as a first gamma correction signal. The signal in which the gradation is converted by first gamma corrector 81 is an example of the signal based on input image signal Data.

Second gamma corrector 92 performs the gradation conversion to generate second output image signal DAT2. Second gamma corrector 92 performs the gradation conversion on the black-and-white image data output from black-and-white image generator 91 such that a characteristic of combined luminance of first liquid crystal panel 20 and second liquid crystal panel 30 becomes desired gamma. For example, second gamma corrector 92 corrects the gradation value of input image signal Data (for example, the gradation value of the black-and-white image data) according to the gamma characteristic of second liquid crystal panel 30. Hereinafter, the signal in which the gradation is converted by second gamma corrector 92 is also referred to as a second gamma correction signal. The second gamma correction signal is an example of the gamma correction signal.

Assuming that D is input gradation (the gradation value normalized by 1) of input image signal Data, that rm is a gamma value of first liquid crystal panel 20, that rs is a gamma value of second liquid crystal panel 30, and that r1 is a gamma value of first gamma corrector 81, and that r2 is a gamma value of second gamma corrector 92, combined luminance L is given by the following equation 1.

$$L = (D^{r1})^{rm} \times (D^{r2})^{rs} = D^{r1 \times rm + r2 \times rs} \quad \text{(equation 1)}$$

For example, when the gamma value rm of first liquid crystal panel 20 and the gamma value rs of second liquid crystal panel 30 are each 2.2, first gamma corrector 81 and second gamma corrector 92 perform the gradation conversion such that the gamma value of combined luminance L becomes 2.2, namely, the following equation 2 is satisfied.

$$r1 + r2 = 1 \quad \text{(equation 2)}$$

For example, first gamma corrector 81 and second gamma corrector 92 include a conversion table (look-up table) based on a gradation conversion characteristic, and may determine the gradation values corresponding to the color image data and black-and-white image data using the conversion table. For example, the conversion table is stored in a storage (not illustrated) of image processor 80.

Image processor 80 only needs to include at least second gamma corrector 92. Second gamma corrector 92 is an example of the first corrector. The first corrector corrects the gradation value of input image signal Data based on input image signal Data and predetermined correction data. The first corrector corrects the gradation value of input image signal Data to a gradation value corresponding to the gradation value according to the gamma characteristic of second liquid crystal panel 30. For example, the first corrector corrects the gradation value of input image signal Data using gamma correction data. The gamma correction data is previously obtained, and stored in, for example, a storage (not illustrated) included in image processor 80. The first corrector performs the above correction on each of a plurality of pixels.

Black-and-white image generator 91 generates black-and-white image data corresponding to a black-and-white image (monochrome image) displayed on second liquid crystal panel 30 based on input image signal Data (color image signal). When acquiring input image signal Data, black-and-white image generator 91 generates the black-and-white image data corresponding to the black-and-white image using a maximum value (an R value, a G value, or a B value) in each color value (for example, an RGB value: [R value, G value, B value]) indicating color information about input image signal Data. Specifically, in the RGB value corresponding to each pixel, black-and-white image generator 91 generates the black-and-white image data by setting the maximum value in the RGB value to the value of the pixel.

Detector 93 detects an image region having a small area brighter than surroundings from the second gamma correction signal. It can be said that detector 93 detects a high-luminance side of a high-frequency signal in the image indicated by the second gamma correction signal. For example, detector 93 detects a high-frequency portion brighter than the surroundings in the image. Consequently, detector 93 can detect the bright portion in the image of the display pattern having the bright portion such as the character on the black background. For example, the high-frequency portion indicates a region having a high-spatial-frequency component in the image. Detector 93 is an example of the first detector. The image region is a region formed by at least one pixel. Hereinafter, the image region is also referred to as a display portion. For example, the small area is an area of about several tens of pixels×several tens of pixels.

Figure 5:
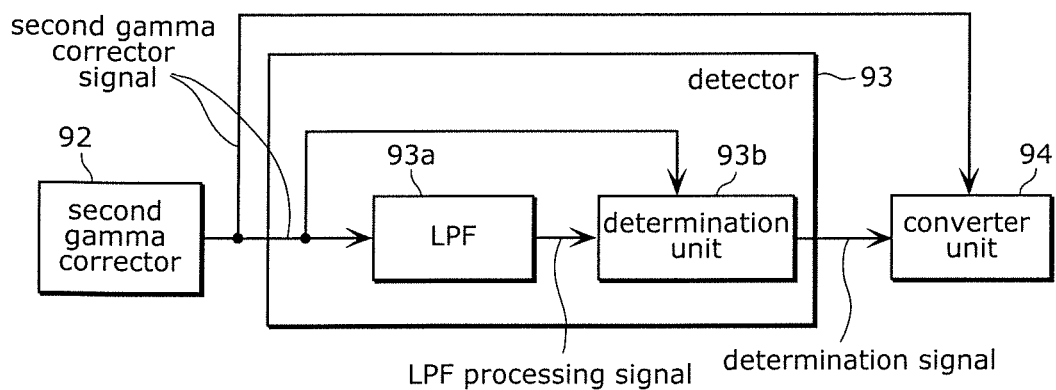
FIG. 5 is a block diagram illustrating a functional configuration of a detector of the first exemplary embodiment.
Figure 6:
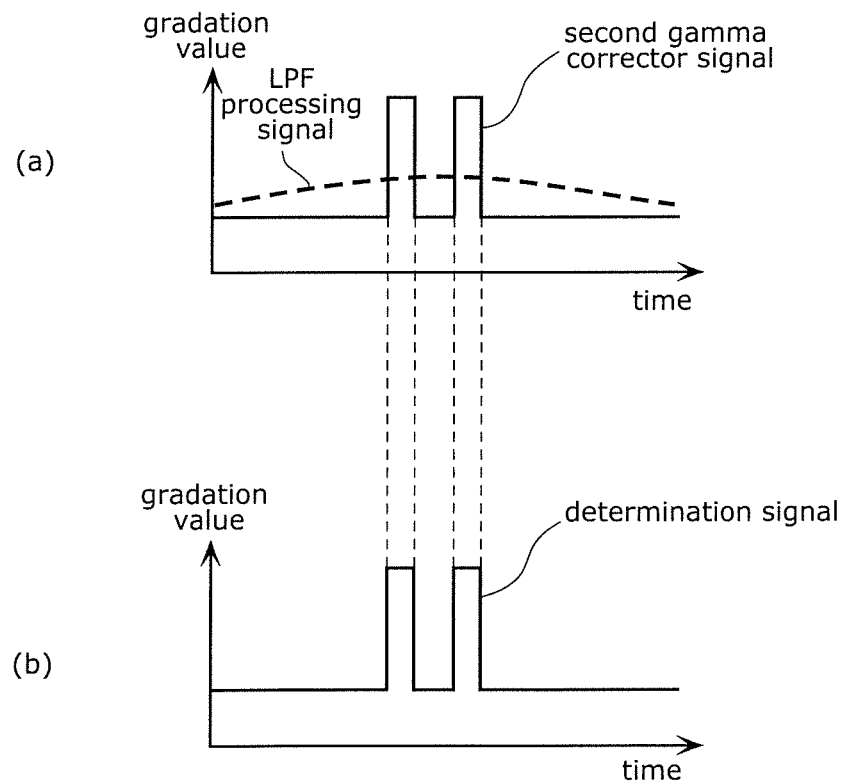
FIG. 6 is a view illustrating processing of the detector of the first exemplary embodiment.

Detector 93 will be described with reference to FIGS. 5 and 6. FIG. 5 is a block diagram illustrating a functional configuration of detector 93 of the first exemplary embodiment. FIG. 6 is a view illustrating processing of detector 93 of the first exemplary embodiment. Specifically, part (a) of FIG. 6 is a view illustrating examples of the second gamma correction signal input to low-pass filter (LPF) 93a and an LPF processing signal output from LPF 93a. Part (b) of FIG. 6 is a view illustrating an example of a determination result output by determination unit 93b.

As illustrated in FIG. 5, detector 93 includes LPF 93a and determination unit 93b.

LPF 93a performs the low-pass filtering processing on the second gamma correction signal. As illustrated in part (a) of FIG. 6, LPF 93a performs the low-pass filtering processing on the second gamma correction signal to generate an LPF processing signal. The filter size of LPF 93a is not particularly limited. The LPF processing signal is an example of the processing signal.

Determination unit 93b determines the high-frequency portion in which the gradation value is to be converted by converter 94 from the second gamma correction signal, using the second gamma correction signal and the LPF processing signal. Determination unit 93b determines whether the pixel is included in the high-frequency portion by comparing a first gradation value indicated by the second gamma correction signal to a second gradation value indicated by the LPF processing signal for each pixel. In the first exemplary embodiment, when the first gradation value is larger than the second gradation value, determination unit 93b determines that the pixel is included in the high-frequency portion having the higher luminance than the surroundings. The determination result includes information indicating whether each pixel is included in the high-frequency portion.

As illustrated in part (b) of FIG. 6, the determination result is such that the high-level gradation value is obtained only in the region where the first gradation value is larger than the second gradation value. Consequently, determination unit 93b can determine an image region brighter than the surroundings as the high-frequency portion in the sub gamma image (see part (b) of FIG. 8 (to be described later)) indicated by the second gamma correction signal.

With reference to FIG. 4 again, converter 94 performs the conversion to lower the gradation value of the second gamma correction signal using the determination result of determination unit 93b. Specifically, converter 94 performs the conversion to lower the gradation value of a portion corresponding to the high-frequency portion (for example, a display portion such as a character) detected by detector 93 in the image indicated by the second gamma correction signal. That is, converter 94 converts the gradation value so as to lower the brightness of the high-frequency portion in the image displayed on second liquid crystal panel 30. Consequently, the brightness of the high-frequency portion of the image displayed on second liquid crystal panel 30 is lower than the brightness of the high-frequency portion of the image based on the second gamma correction signal.

For example, converter 94 calculates a conversion value (gradation value) obtained by converting the gradation value of the high-frequency portion of the second gamma correction signal using the following equation 3.

$$\text{conversion value}=(\text{gradation value of second gamma correction signal})^{1/r2} \quad \text{(equation 3)}$$

For example, when second gamma corrector 92 has gamma value r2 of 0.5, the conversion value is given by the following equation 4.

$$\text{conversion value}=(\text{gradation value of second gamma correction signal})^{2} \quad \text{(equation 4)}$$

In liquid crystal display device 10, a minimum value of second output image signal DAT2 at which the luminance of the image indicated by input image signal Data can be reproduced is obtained when first output image signal DAT1 has the gradation value of 1. At this point, the gradation value of second output image signal DAT2 becomes the same gradation value of input image signal Data from a condition of first output image signal DAT1×second output image signal DAT2=input image signal Data. That is, when second output image signal DAT2 is equal to input image signal Data, the gradation value of second output image signal DAT2 is minimized within a range where the image can be obtained based on input image signal Data. It can also be said that converter 94 converts (corrects) the gradation value of the high-frequency portion of second output image signal DAT2 into the gradation value of the portion corresponding to the high-frequency portion in input image signal Data.

As described above, the display on second liquid crystal panel 30 can hardly visually be recognize by lowering the brightness of the display portion of the second image displayed on second liquid crystal panel 30, whereby converter 94 can prevent the generation of the halo, the double image, or the like. When the liquid crystal panel is an in plane switching (IPS) panel, a problem of coloring (a phenomenon in which a display color becomes bluish or reddish) is generated when the low gradation portion is viewed obliquely. In a liquid crystal display device in which at least two liquid crystal panels are superposed, the coloring is conspicuous. Through the above processing, liquid crystal display device 10 of the first exemplary embodiment suppresses a level (gradation value) of second output image signal DAT2, and increases a level (gradation value) of first output image signal DAT1, which allows the coloring to be prevented when the low gradation portion is viewed obliquely. In particular, when the liquid crystal panel is the IPS panel, the coloring is significantly improved. Converter 94 is an example of the second corrector.

At this point, the display portion of the second image displayed on second liquid crystal panel 30 is darker than the display portion of the first image displayed on first liquid crystal panel 20. In other words, for example, converter 94 displays the brightness of the display portion of the second image such that the display portion of the first image (for example, the main image illustrated in part (e) of FIG. 7 (to be described later)) displayed on first liquid crystal panel 20 is brighter than the display portion of the second image displayed on second liquid crystal panel 30.

Parallax reduction unit 95 receives the gradation-corrected second gamma correction signal output from converter 94, performs smoothing processing on gradation-corrected input image signal Data, and generates second output image signal DAT2. Parallax reduction unit 95 performs the correction to reduce the parallax between the first image based on first output image signal DAT1 and the second image based on second output image signal DAT2. When acquiring the gradation-corrected second gamma correction signal, parallax reduction unit 95 performs extension filtering processing on the second gamma correction signal to extend a high-luminance region. For example, concerning each pixel (target pixel) of second liquid crystal panel 30, the expansion filtering processing is processing of setting a maximum value of luminance within a predetermined filter size (for example, several pixels×several pixels) to the luminance of the pixel (target pixel). The expansion filtering processing is performed on each of the plurality of pixels. The high-luminance region (for example, a white region) extends as a whole through the expansion filtering processing. Consequently, the degradation of the image quality due to the generation of the parallax such as a double image in which an outline of the image appears double can be prevented when liquid crystal display device 10 is viewed from an oblique direction. The filter size is not particularly limited. The filter shape is not limited to the square shape, but may be a circular shape.

Parallax reduction unit 95 is constructed with a low-pass filter such as what is called a MAX filter (maximum value filter) and a Gaussian filter. That is, parallax reduction unit 95 performs the low-pass filtering processing. Preferably, the low-pass filter may change the filter size. Parallax reduction unit 95 can perform the parallax reduction corresponding to an interval between first liquid crystal panel 20 and second liquid crystal panel 30 by deciding an appropriate filter size according to the interval. The signal output by parallax reduction unit 95 is second output image signal DAT2. Second output image signal DAT2 is a signal generated based on the second gamma correction signal corrected by converter 94.

Corrector 100 receives at least second output image signal DAT2 output from parallax reduction unit 95, and generates first output image signal DAT1 output to first liquid crystal panel 20 based on at least second output image signal DAT2. Corrector 100 corrects the first gamma correction signal that is input image signal Data gradation-corrected by first gamma corrector 81 using second output image signal DAT2, thereby generating first output image signal DAT1. In the first exemplary embodiment, corrector 100 receives second output image signal DAT2 and input image signal Data gradation-corrected by second gamma corrector 92, and generates first output image signal DAT1 based on second output image signal DAT2 and gradation-corrected input image signal Data.

Corrector 100 corrects the gradation value of each pixel of the first gamma correction signal output from first gamma corrector 81 such that a combine image of the first image displayed on first liquid crystal panel 20 based on first output image signal DAT1 and the second image displayed on second liquid crystal panel 30 based on second output image signal DAT2 becomes the image based on input image signal Data, thereby generating first output image signal DAT1. In the first exemplary embodiment, corrector 100 corrects the first gamma correction signal (color image data) output from first gamma corrector 81 using the second gamma correction signal output from second gamma corrector 92 and second output image signal DAT2 output from parallax reduction unit 95. As described above, corrector 100 performs processing of feeding back a change in the signal changed by converter 94 and parallax reduction unit 95 to the signal on the side of first liquid crystal panel 20. Combined luminance L is maintained at $L=D^{2.2}$ according to the equation 1 by maintaining first output image signal DAT1×second output image signal DAT2=input image signal Data.

Corrector 100 includes division processor 101 and multiplier 102.

Division processor 101 calculates a correction value used to correct the gradation value of each pixel of the first gamma correction signal based on the second gamma correction signal and second output image signal DAT2. For example, division processor 101 calculates the correction value by dividing the second gamma correction signal by second output image signal DAT2. Alternatively, division processor 101 may acquire the correction value by referring to a lookup table.

Multiplier 102 corrects the gradation value of the first gamma correction signal output from first gamma corrector 81 based on the acquired correction value. Specifically, multiplier 102 sets the gradation value obtained by multiplying the first gamma correction signal by the correction value, to the gradation value of first output image signal DAT1. Consequently, first output image signal DAT1 becomes the signal of the gradation value reflecting the pieces of processing of converter 94 and parallax reduction unit 95.

For example, each component included in image processor 80 is formed of a dedicated circuit. Alternatively, each component may be formed of a processor or the like.

1-2. Operation of Liquid Crystal Display Device

Figure 7:
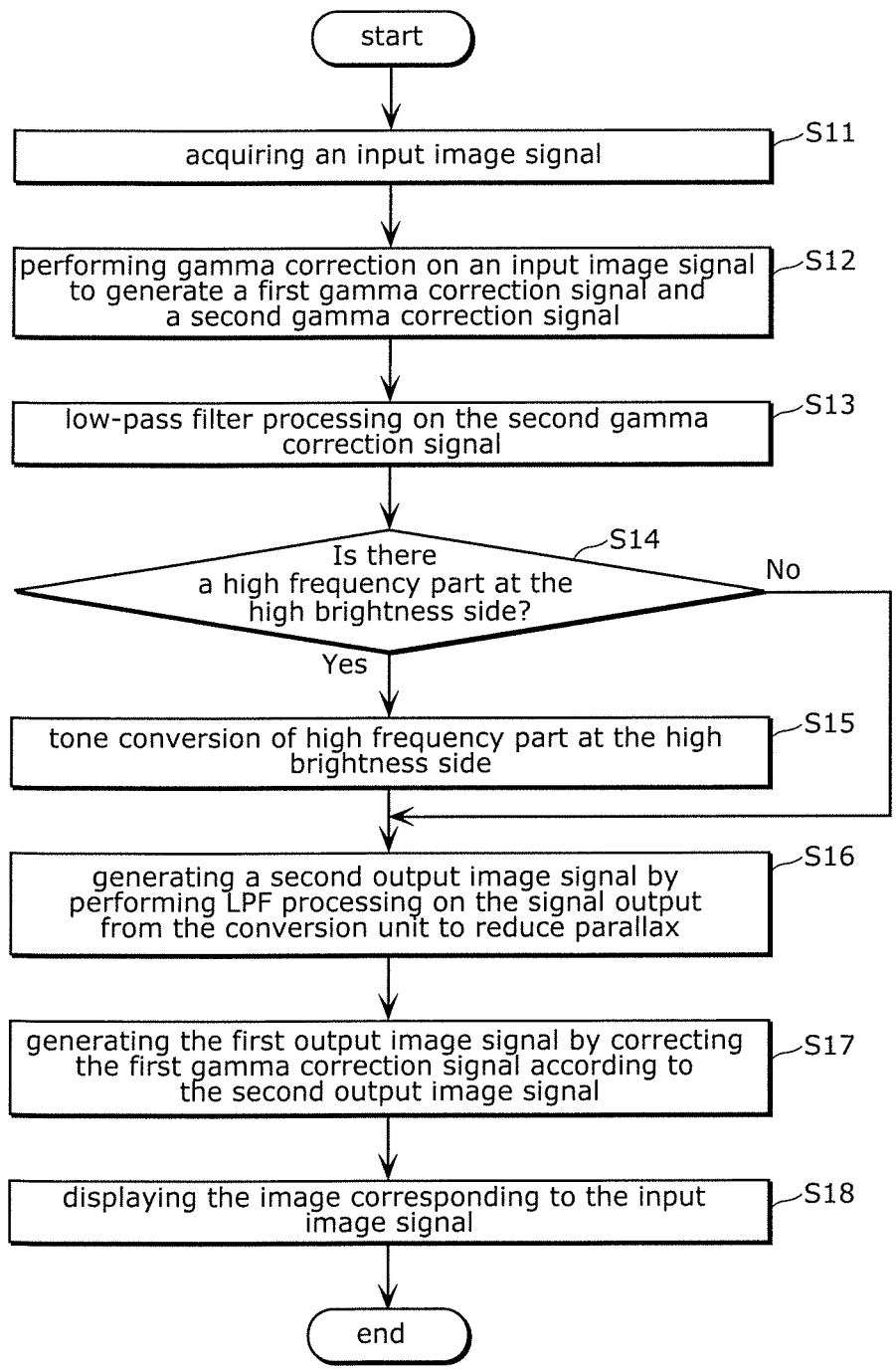
FIG. 7 is a flowchart illustrating operation of the liquid crystal display device of the first exemplary embodiment.
Figure 8:
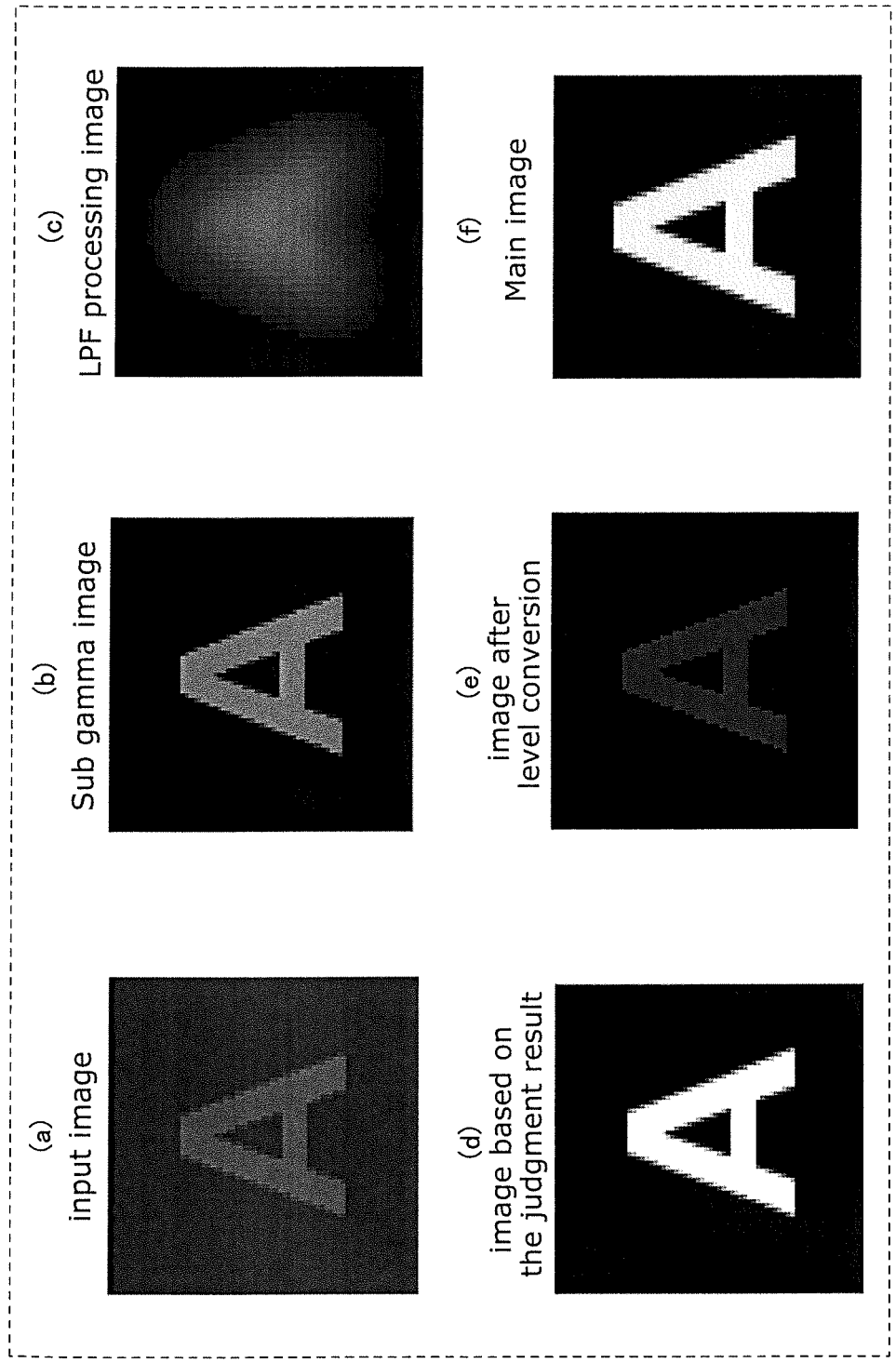
FIG. 8 is a view schematically illustrating various images generated by the liquid crystal display device of the first exemplary embodiment.

Operation of liquid crystal display device 10 will be described below with reference to FIGS. 7 and 8. FIG. 7 is a flowchart illustrating the operation of liquid crystal display device 10 of the first exemplary embodiment. Steps S11 to S17 in FIG. 7 illustrate the operation of image processor 80. FIG. 8 is a view schematically illustrating various images generated by liquid crystal display device 10 of the first exemplary embodiment.

As illustrated in FIG. 7, first, liquid crystal display device 10 acquires input image signal Data (S11). Specifically, image processor 80 acquires input image signal Data by receiving input image signal Data transmitted from an external system (not illustrated). It is assumed that input image signal Data is an image signal used to display the color image. For example, liquid crystal display device 10 acquires input image signal Data to display the input image in part (a) of FIG. 8. The input image is an image region (display portion) where a portion "A" is brighter than the surroundings.

Subsequently, image processor 80 performs gamma correction on input image signal Data to generate the first gamma correction signal and the second gamma correction signal (S12). Specifically, first gamma corrector 81 performs the gradation conversion on input image signal Data to generate the first gamma correction signal according to a gamma characteristic of first liquid crystal panel 20. First gamma corrector 81 outputs the generated first gamma correction signal to corrector 100.

Second gamma corrector 92 performs the gradation conversion on the black-and-white image data generated by black-and-White image generator 91 based on input image signal Data, thereby generating the second gamma correction signal according to the gamma characteristic of second liquid crystal panel 30. For example, second gamma corrector 92 generates the second gamma correction signal indicating the sub gamma image in part (b) of FIG. 8. Second gamma corrector 92 outputs the generated second gamma correction signal to detector 93, converter 94, and corrector 100.

Subsequently, LPF 93a of detector 93 performs the low-pass filtering processing on the second gamma correction signal (S13). For example, LPF 93a performs the low-pass filtering processing to generate an LPF processing signal indicating the LPF processing image in part (c) of FIG. 8. Then, LPF 93a outputs the generated LPF processing signal to determination unit 93b.

Subsequently, based on the second gamma correction signal and the LPF processing signal, determination unit 93b determines whether the high-frequency portion (hereinafter, also simply referred to as a high-frequency portion) having the higher luminance than the surroundings exists in the second gamma correction signal (S14). Determination unit 93b determines whether the first gradation value indicated by the second gamma correction signal is larger than the second gradation value indicated by the LPF processing signal for each pixel, and determines that the pixel is included in the high-frequency portion when the first gradation value is larger than the second gradation value. Determination unit 93b determines the high-frequency portion in the sub gamma image by repeating the above determination for each pixel. For example, part (b) of FIG. 8 will be described as an example. Determination unit 93b determines that the portion "A" illustrated in the sub gamma image is the high-frequency portion.

Then, determination unit 93b outputs a determination signal indicating the result of the determination whether the high-frequency portion exists, to converter 94. For example, the determination signal may be a signal in which the high-frequency portion is at a high level while other portions are at a low level. That is, the determination signal may be a binarized signal (binary signal). For example, determination unit 93b generates the determination signal indicating the image based on the determination result in part (d) of FIG. 8. When the high-frequency portion does not exist, determination unit 93b outputs the determination signal indicating that the high-frequency portion does not exist, to converter 94. The determination signal is an example of the detection result.

Subsequently, when acquiring the determination signal indicating that the high-frequency portion exists (Yes in S14), converter 94 performs the gradation conversion on the gradation value in the portion corresponding to the high-frequency portion in the second gamma correction signal (S15). Specifically, converter 94 performs the gradation conversion so as to lower the gradation value of the second gamma correction signal of the portion corresponding to the high-frequency portion. For example, converter 94 converts the gradation value of the second gamma correction signal in the portion corresponding to the high-frequency portion into the gradation value indicated by input image signal Data. For example, converter 94 converts the gradation value to generate the gradation-converted second gamma correction signal indicating the level-converted image in part (e) of FIG. 8. As illustrated in part (b) of FIG. 8 and part (e) of FIG. 8, the level-converted image is lower than the sub gamma image in the brightness of the portion "A" that is the high-frequency portion. For example, the gradation value of the high-frequency portion illustrated in part (e) of FIG. 8 may be equal to the gradation value of the high-frequency portion illustrated in part (a) of FIG. 8. Then, converter 94 outputs the gradation-converted second gamma correction signal to parallax reduction unit 95.

When acquiring the determination result indicating that the high-frequency portion does not exist (No in S14), converter 94 proceeds to step S16 without performing the gradation conversion of the second gamma correction signal.

Parallax reduction unit 95 generates second output image signal DAT2 by performing the low-pass filtering processing of reducing the parallax on the signal (for example, the gradation-converted second gamma correction signal) output from converter 94 (S16). Any existing technique may be used to the low-pass filtering processing of reducing the parallax. Then, parallax reduction unit 95 outputs generated second output image signal DAT2 to second liquid crystal panel 30 and corrector 100.

Corrector 100 corrects the first gamma correction signal according to second output image signal DAT2 to generate first output image signal DAT1 (S17). Specifically, division processor 101 calculates the correction value used to correct the first gamma correction signal based on the second gamma correction signal output from second gamma corrector 92 and second output image signal DAT2 output from parallax reduction unit 95. For example, division processor 101 calculates the correction value by dividing the second gamma correction signal by second output image signal DAT2. Division processor 101 outputs the calculated correction value to multiplier 102.

Based on the first gamma correction signal output from first gamma corrector 81 and the correction value output from division processor 101, multiplier 102 generates first output image signal DAT1 output to first liquid crystal panel 20. For example, multiplier 102 generates first output image signal DAT1 by multiplying the first gamma correction signal by the correction value. Multiplier 102 outputs generated first output image signal DAT1 to first liquid crystal panel 20. For example, multiplier 102 outputs first output image signal DAT1 indicating the main image (first image) illustrated in part (f) of FIG. 8 to first liquid crystal panel 20.

For example, the main image is an image brighter than the level-converted image. That is, for example, the main image is an image brighter than the sub image (second image). At this point, for example, the gradation value of the portion corresponding to the high-frequency portion in generated first output image signal DAT1 is higher than the gradation value of the portion corresponding to the high-frequency portion in second output image signal DAT2.

Subsequently, liquid crystal display device 10 displays the image corresponding to input image signal Data (S18). For example, liquid crystal display device 10 displays the combined image in which the first image based on the first output image signal DAT1 and the second image based on the second output image signal DAT2 are combined. At this point, the gradation value of the high-frequency portion in the image displayed on second liquid crystal panel 30 is lowered through the processing in step S15. For this reason, because the high-frequency portion of the second image displayed on second liquid crystal panel 30 has the low luminance in the image displayed in step S18, the halo or the double image is prevented from being seen in second liquid crystal panel 30 even when second liquid crystal panel 30 is viewed obliquely. The generation of the picture lacking is prevented because the filter size of parallax reduction unit 95 is not changed in order to prevent the halo.

As described above, image processor 80 generates second output image signal DAT2 output to second liquid crystal panel 30 of liquid crystal display device 10 including first liquid crystal panel 20 and second liquid crystal panel 30 that is disposed so as to be superposed on first liquid crystal panel 20. Image processor 80 includes second gamma corrector 92 that generates the second gamma correction signal in which the gradation value of input image signal Data is corrected, detector 93 that receives second gamma correction signal and detects the image region brighter than the surroundings as a first high-frequency portion from the second gamma correction signal, and converter 94 that receives the second gamma correction signal and the detection result of detector 93 and performs the correction to lower the gradation value of the first high-frequency portion in the second gamma correction signal. Second output image signal DAT2 is generated based on the second gamma correction signal corrected by converter 94.

Image processor 80 is an example of the image processing device, the second gamma correction signal is an example of the gamma correction signal, second gamma corrector 92 is an example of the first corrector, and converter 94 is an example of the second corrector.

Consequently, the gradation value of the pixel constituting the high-frequency portion in second output image signal DAT2 becomes a low value. That is, in the second image displayed on second liquid crystal panel 30 and the second image based on second output image signal DAT2, the high-frequency portion becomes darker as compared with the case where the gradation value is not converted by converter 94. Because the second image has the dark high-frequency portion, the second image is an image in which the halo, the double image, or the like is prevented from being visually recognized even when viewed from the oblique direction. Thus, image processor 80 can prevent the degradation of the image quality in the image displayed by liquid crystal display device 10 including first liquid crystal panel 20 and second liquid crystal panel 30 that is disposed so as to overlap first liquid crystal panel 20 on the back surface side of first liquid crystal panel 20.

Converter 94 corrects the gradation value of the first high-frequency portion to the gradation value of the first high-frequency portion in input image signal Data.

Consequently, the gradation value of the high-frequency portion of second output image signal DAT2 can be set to the minimum value in a range where the image indicated by input image signal Data can be obtained. That is, because the second image has the darker high-frequency portion, the second image is an image in which the halo or the double image is further prevented from being visually recognized even when viewed from the oblique direction. Thus, image processor 80 can further prevent the degradation of the image quality of the image displayed by liquid crystal display device 10.

Detector 93 includes LPF 93a that receives the second gamma correction signal and generates the LPF processing signal by performing the low-pass filtering processing on the second gamma correction signal, and determination unit 93b that receives the second gamma correction signal and the LPF processing signal and determines the first high-frequency portion based on the second gamma correction signal and the LPF processing signal.

The LPF processing signal is an example of the processing signal.

Consequently, detector 93 that detects the high-frequency portion can be constructed with a simple configuration.

Determination unit 93b determines whether the first gradation value indicated by the second gamma correction signal is higher than the second gradation value indicated by the LPF processing signal for each of the plurality of pixels, and determines that at least one pixel in which the first gradation value is higher than the second gradation value is the first high-frequency portion.

Consequently, determination unit 93b can detect the high-frequency portion through such simple processing that the gradation values are compared to each other. Thus, a processing amount of determination unit 93b can be decreased.

Image processor 80 further includes parallax reduction unit 95 that receives the signal from converter 94, performs the smoothing processing on the signal, and generates second output image signal DAT2.

Consequently, image processor 80 can prevents the halo, the double image, or the like from being visually recognized without changing the filter size in parallax reduction unit 95. That is, image processor 80 reduces the filter size of parallax reduction unit 95 to prevent the halo or the like, which allows the prevention of the generation of the picture lacking. Thus, image processor 80 can achieve the compatibility between the prevention of the halo or the like and the prevention of the picture lacking.

Image processor 80 of liquid crystal display device 10 further includes corrector 100 that receives at least second output image signal DAT2 and generates first output image signal DAT1 output to first liquid crystal panel 20 based on at least second output image signal DAT2. Liquid crystal display device 10 includes first liquid crystal panel 20 that receives first output image signal DAT1.

Consequently, liquid crystal display device 10 can prevent the degradation of the image quality due to the halo or the like while obtaining the brightness of the image indicated by input image signal Data.

Corrector 100 of image processor 80 also receives the second gamma correction signal. Corrector 100 includes division processor 101 that calculates the correction value based on the gamma correction signal and second output image signal DAT2 and multiplier 102 that generates first output image signal DAT1 based on the correction value and the first gamma correction signal.

The first gamma correction signal is an example of the signal based on input image signal Data.

Consequently, the calculated correction value becomes a value reflecting the processing of parallax reduction unit 95. That is, first output image signal DAT1 is a signal reflecting the processing of parallax reduction unit 95. Thus, the degradation of the image quality due to the processing of parallax reduction unit 95 can be prevented.

As described above, liquid crystal display device 10 includes image processor 80 and second liquid crystal panel 30 that receives second output image signal DAT2.

Consequently, liquid crystal display device 10 in which the degradation of the image quality is prevented is constructed.

Liquid crystal display device 10 further includes the first liquid crystal panel that displays the color image. Second liquid crystal panel 30 is disposed on the back surface side of first liquid crystal panel 20, and displays the monochrome image.

Consequently, the degradation of image quality of the image displayed by liquid crystal display device 10 can be prevented in liquid crystal display device 10 in which first liquid crystal panel 20 displays the color image while second liquid crystal panel 30 displays the monochrome image.

Second Exemplary Embodiment

Figure 9:
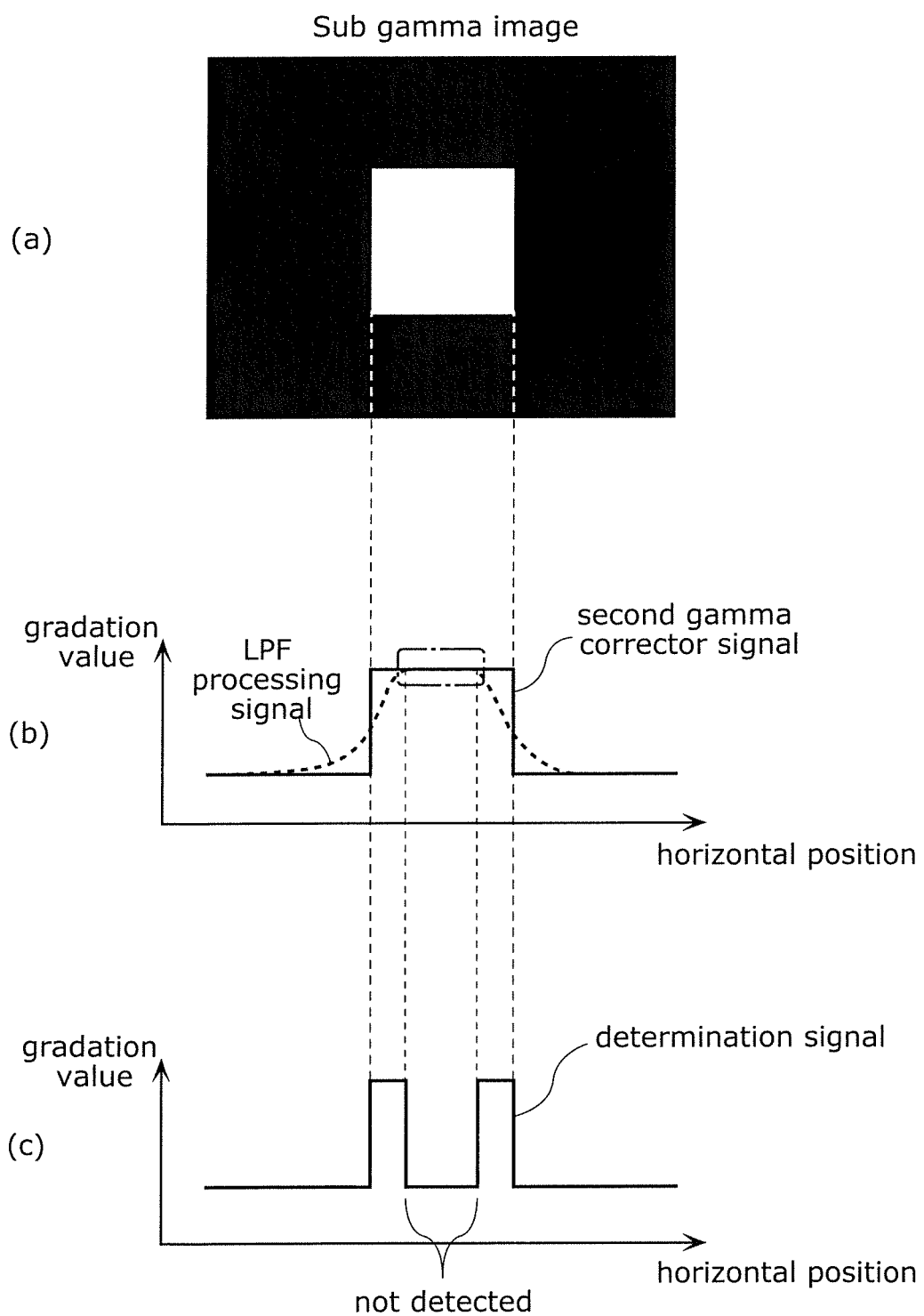
FIG. 9 is a first view illustrating a problem to be solved in a liquid crystal display device according to a second exemplary embodiment.
Figure 10:
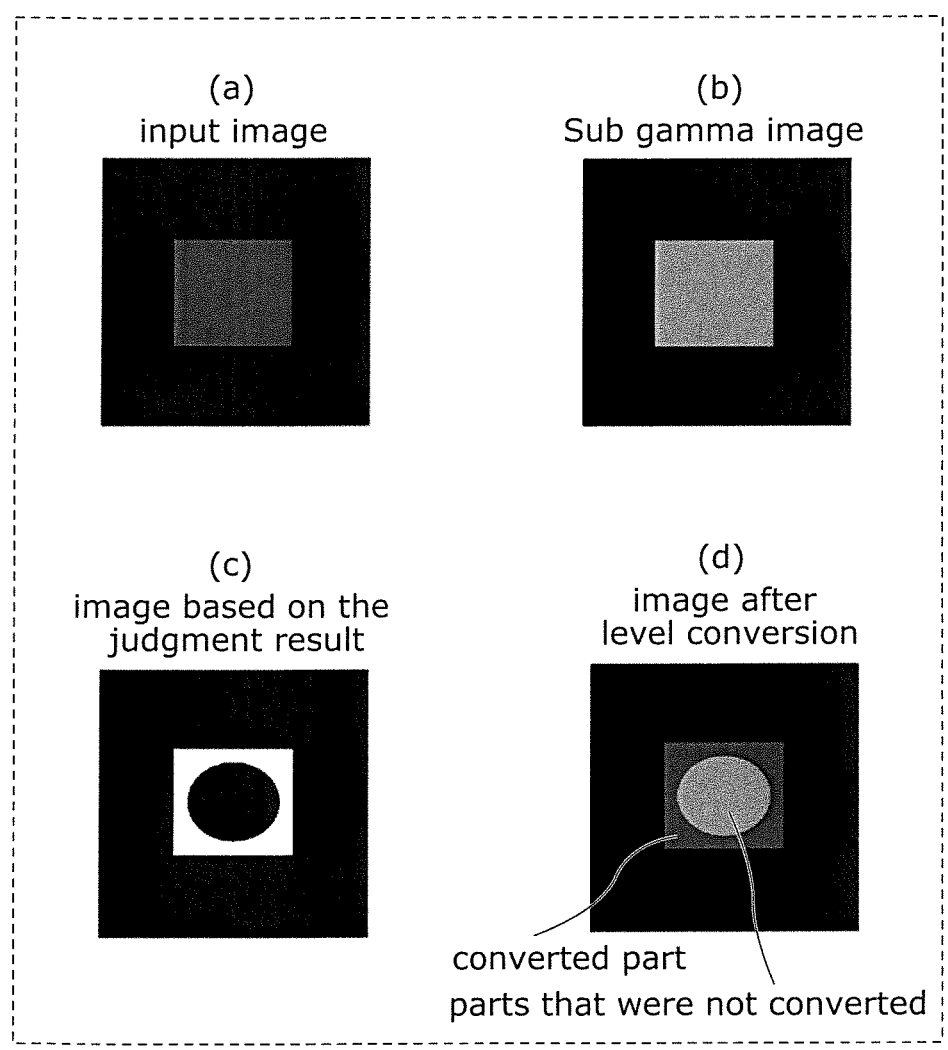
FIG. 10 is a second view illustrating a problem to be solved in the liquid crystal display device of the second exemplary embodiment.

A liquid crystal display device according to a second exemplary embodiment will be described below with reference to FIGS. 9 to 15. A problem to be solved in the liquid crystal display device of the second exemplary embodiment will be described with reference to FIGS. 9 and 10. FIG. 9 is a first view illustrating the problem to be solved in the liquid crystal display device of the second exemplary embodiment. Specifically, part (a) of FIG. 9 illustrates the sub gamma image based on the second gamma correction signal, part (b) of FIG. 9 illustrates various signals input to the determination unit, and part (c) of FIG. 9 illustrates the determination signal output from the determination unit. FIG. 10 is a second view illustrating the problem to be solved in the liquid crystal display device of the second exemplary embodiment. Specifically, FIG. 10 is a view schematically illustrating various images generated by a liquid crystal display device according to a comparative example. In FIGS. 9 and 10, the image region (display portion) brighter than the surrounding region is illustrated in a rectangular shape, but the shape of the image region is not limited to the rectangular shape.

Hereinafter, each component of the liquid crystal display device of the comparative example will be described using the reference numeral of each component of liquid crystal display device 10 described in the first exemplary embodiment.

As illustrated in part (a) of FIG. 9, it is assumed that the sub gamma image is an image displaying a white window. It is assumed that the white window is sufficiently larger than the filter size of LPF 93a. As used herein, for example, the term "sufficiently large" means such a size that the pixel in which the gradation value does not change before and after the low-pass filtering processing of LPF 93a exists in the plurality of pixels constituting the white window. The white window is an example of the high-frequency portion.

The sub gamma image in part (a) of FIG. 9 is an image in which the sub gamma image in part (b) of FIG. 10 is enlarged. In part (a) of FIG. 9, the high-frequency portion is indicated in white for convenience. The sub gamma image in part (a) of FIG. 9 is an image based on the input image in part (a) of FIG. 10.

As illustrated in part (a) of FIG. 9, when the size of the white window is sufficiently larger than the filter size, sometimes detector 93 does not accurately detect the high-frequency portion. Details will be described below.

As illustrated in part (b) of FIG. 9, determination unit 93b compares the second gamma correction signal indicating the sub gamma image to the LPF processing signal obtained by performing the low-pass filtering processing on the second gamma correction signal using LPF 93a. Because the size of the white window is sufficiently larger than the filter size, the pixel in which the gradation value after the LPF processing is equal to the gradation value before the LPF processing (see an alternate long and short dash line).

When the second gamma correction signal and the LPF processing signal are compared to each other, sometimes determination unit 93b does not correctly make the determination in the pixel in which the gradation value does not change before and after the low-pass filtering processing. When the first gradation value indicated by the second gamma correction signal is larger than the second gradation value indicated by the LPF processing signal, determination unit 93b determines that the pixel is included in the high-frequency portion. For this reason, when the first gradation value is equal to the second gradation value, determination unit 93b does not determine that the pixel is included in the high-frequency portion. Consequently, for example, as illustrated in part (c) of FIG. 9, the determination result indicating that the pixel is not the high-frequency portion is output in the pixel in which the first gradation value is equal to the second gradation value. That is, the pixel in which the first gradation value is equal to the second gradation value is not detected as the high-frequency portion.

Part (c) of FIG. 10 illustrates an image based on the determination result of determination unit 93b with respect to the sub gamma image illustrated in part (b) of FIG. 10. That is, the image illustrated in part (c) of FIG. 10 is an image based on the determination signal in part (c) of FIG. 9. Although the rectangular high-frequency portion is originally detected, a central portion of the high-frequency portion is displayed in an elliptical black color as illustrated in part (c) of FIG. 10. This indicates that the central portion of the high-frequency portion is not a portion to be gradation-converted by converter 94.

Because converter 94 corrects the gradation value of the sub gamma image using the determination signal illustrated in part (c) of FIG. 10, the gradation value of the portion corresponding to the elliptical portion in the sub gamma image is not converted from the gradation value of the sub gamma image as illustrated in the level-converted image in part (d) of FIG. 10. Consequently, in the second image displayed on second liquid crystal panel 30, luminance unevenness is generated in the central portion of the white window and the surroundings of the central portion.

In this way, in the liquid crystal display device of the comparative example, when the size of the high-frequency portion is sufficiently larger than the filter size of LPF 93a of detector 93, sometimes determination unit 93b cannot correctly determine the high-frequency portion. As a result, the converter 94 cannot properly convert the gradation value of the second gamma correction signal.

For this reason, a liquid crystal display device including an image processor in which the method for detecting the high-frequency portion to be gradation-converted by converter 94 is different from that of the first exemplary embodiment will be described in the second exemplary embodiment.

2-1. Configuration of Liquid Crystal Display Device

The liquid crystal display device of the second exemplary embodiment will be described below with reference to FIGS. 11 to 14.

Figure 11:
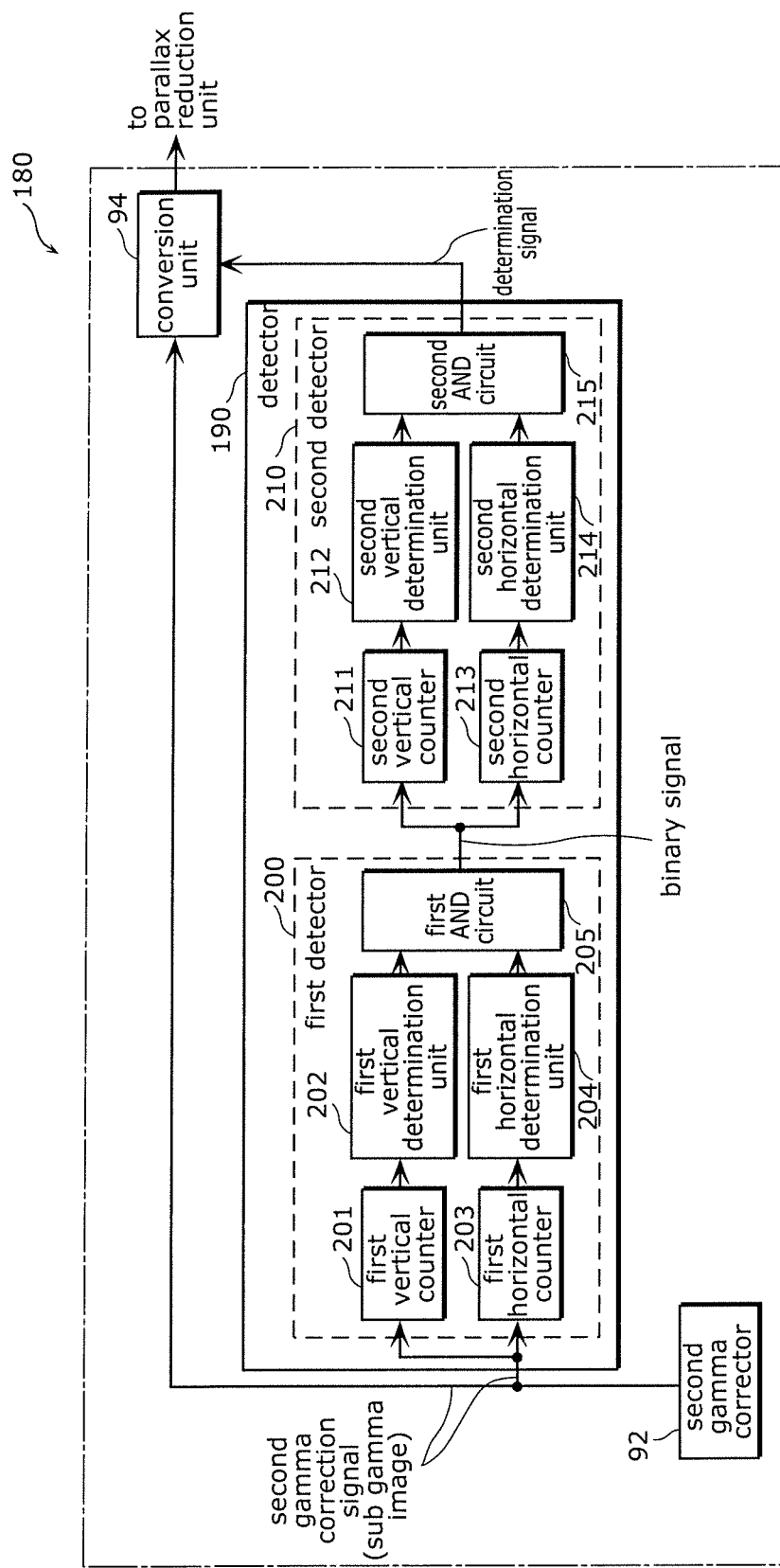
FIG. 11 is a block diagram illustrating some functional configurations of an image processor of the second exemplary embodiment.

FIG. 11 is a block diagram illustrating some functional configurations of image processor 180 of the second exemplary embodiment. Specifically, FIG. 11 is a block diagram illustrating a functional configuration corresponding to the portion indicated by the alternate long and short dash line in FIG. 4 in the configuration of image processor 180. Image processor 180 is mainly different from image processor 80 of the first exemplary embodiment in that image processor 180 includes detector 190 instead of detector 93. Image processor 180 of the second exemplary embodiment will be described below while focusing on the difference from image processor 80 of the first exemplary embodiment. In the second exemplary embodiment, the same or similar configuration as image processor 80 of the first exemplary embodiment is denoted by the same reference numeral as image processor 80, and the description is omitted or simplified.

As illustrated in FIG. 11, image processor 180 includes detector 190. Detector 190 detects the high-frequency portion to be gradation-converted and the high-frequency portion not to be gradation-converted according to the size of the high-frequency portion. For example, when the size of the high-frequency portion is larger than a predetermined area, detector 190 outputs to converter 94 the determination signal including that the high-frequency portion is the portion in which the gradation value is not converted. Consequently, in image processor 180, when the size of the high-frequency portion is larger than the predetermined area, converter 94 does not perform the gradation conversion, so that the generation of the luminance unevenness in part (d) of FIG. 10 can be prevented in the high-frequency portion.

Detector 190 includes first detector 200 and second detector 210. Detector 190 is included in the sub-side image processor. Detector 190 only needs to include at least first detector 200.

First detector 200 detects the image region (display portion) brighter than the surroundings as the high-frequency portion. However, when the image region is insufficiently smaller than a black background detection range that is a predetermined range, first detector 200 operates such that converter 94 does not recognize as the gradation-converted high-frequency portion. First detector 200 performs the above operation by determining whether the high-frequency portion is less than or equal to the predetermined area. The black background detection range is defined by the number of pixels counted by first vertical counter 201 and first horizontal counter 203 (to be described later), and becomes (2N1+1)×(2M1+1) pixels in the following example.

First detector 200 includes first vertical counter 201, first vertical determination unit 202, first horizontal counter 203, first horizontal determination unit 204, and first AND circuit 205.

First vertical counter 201 counts the number of pixels of interest and the number of pixels in a predetermined range in a vertical direction of the pixel of interest, for example, the number of pixels at the black background level from vertical up and down M1 pixels. First vertical counter 201 counts the number of pixels at the black background level from (2M1+1) pixels. The gradation value indicating the black background level is an example of the second threshold, and is previously set. M1 is an integer of 1 or more. The pixel of interest is a pixel constituting the high-frequency portion in the sub gamma image. For example, the pixel of interest is a pixel having the gradation value higher than the black background level. First vertical counter 201 counts the number of pixels in each of the pixels having the gradation value higher than the black background level.

First vertical determination unit 202 determines whether the number of pixels at the black background level counted by first vertical counter 201 is greater than or equal to a first proportion. For example, first vertical determination unit 202 determines whether the number of pixels at the black background level is greater than or equal to 50% of (2M1+1) pixels. The first proportion is not limited to 50%.

First horizontal counter 203 counts the number of pixels of interest and the number of pixels in a predetermined range in a horizontal direction of the pixel of interest, for example, the number of pixels at the black background level from horizontal left and right N1 pixels. First horizontal counter 203 counts the number of pixels at the black background level from (2N1+1) pixels. The gradation value indicating the black background level is an example of the second threshold, and is previously set. The gradation value at which first horizontal counter 203 determines the black background level may be equal to the gradation value at which the first vertical counter 201 determines the black background level. N1 is an integer of 1 or more. N1 may be the same value as M1.

First horizontal determination unit 204 determines whether the number of pixels at the black background level counted by first horizontal counter 203 is greater than or equal to a second proportion. For example, first horizontal determination unit 204 determines whether the number of pixels at the black background level is greater than or equal to 50% of (2N1+1) pixels. The second proportion is not limited to 50%. The second proportion may be equal to the first proportion.

First AND circuit 205 outputs a signal indicating whether to recognize the pixel of interest as the high-frequency portion to second detector 210 based on the determination result of first vertical determination unit 202 and the determination result of first horizontal determination unit 204. When first AND circuit 205 acquires the determination result indicating that the number of pixels at the black background level is greater than or equal to the first proportion from first vertical determination unit 202 while acquiring the number of pixels at the black background level is greater than or equal to the second proportion from first horizontal determination unit 204, first AND circuit 205 outputs a signal indicating that the pixel of interest is a pixel recognized as the high-frequency portion to second detector 210.

For example, first AND circuit 205 calculates a logical product of the signal from first vertical determination unit 202 and the signal from first horizontal determination unit 204. When acquiring a high-level signal indicating that the number of pixels at the black background level is greater than or equal to the first predetermined proportion from both first vertical determination unit 202 and first horizontal determination unit 204, first AND circuit 205 detects the pixel of interest as the black background, and outputs the high-level signal to second detector 210. The pixel of interest detected as the black background is a pixel to be gradation-converted by converter 94. For example the high-level signal may be a signal indicating that the gradation value is 1. For example, the first predetermined proportion indicates the case where the first proportion and the second proportion are the same.

When acquiring a low-level signal indicating that the number of pixels at the black background level is less than the first predetermined proportion from at least one of first vertical determination unit 202 and first horizontal determination unit 204, first AND circuit 205 outputs the low-level signal to second detector 210. For example, the low-level signal may be a signal indicating that the gradation value is less than or equal to the black background level. The high-level or low-level signal output from first AND circuit 205 is also referred to as a binary signal.

In the second exemplary embodiment, when the number of pixels at the vertical black background level is greater than or equal to M1+1, and when the number of pixels at the horizontal black background level is greater than or equal to N1+1, first detector 200 detects the pixel of interest as the pixel to be gradation-converted by converter 94 and as the black background.

When detector 190 does not include second detector 210, first AND circuit 205 outputs the binary signal to converter 94. In this case, the binary signal output from first AND circuit 205 is an example of the determination signal.

Figure 12A:
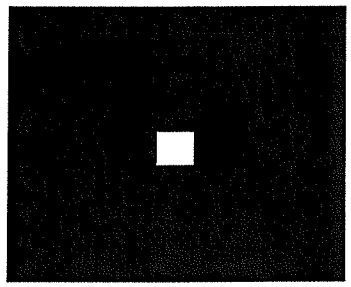
FIG. 12A is a first view illustrating processing of a first detector of the second exemplary embodiment.
Figure 12A:
Figure 12B:
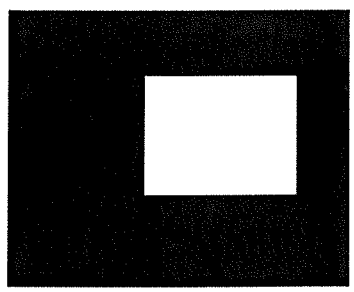
FIG. 12B is a second view illustrating the processing of the first detector of the second exemplary embodiment.
Figure 12B:
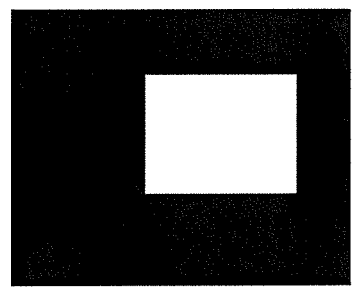

FIG. 12A is a first view illustrating the processing of first detector 200 of the second exemplary embodiment. FIG. 12B is a second view illustrating the processing of first detector 200 of the second exemplary embodiment. The images in FIGS. 12A and 12B are images in the black background detection range. The image in the black background detection range may be a partial region of the sub gamma image. The display portion in FIG. 12A is formed of (N×M) pixels or less.

As illustrated in part (a) of FIG. 12A, when the display portion has the small pattern, the pattern disappears as illustrated in part (b) of FIG. 12A because the display portion is detected as the black background by the processing of first detector 200. Consequently, when the display portion has the small pattern, the display portion can be recognized as a target gradation-converted by converter 94.

On the other hand, as illustrated in part (a) of FIG. 12B, when the display portion has the large pattern, the pattern remains as it is as illustrated in part (b) of FIG. 12B because the display portion is not detected as the black background by the processing of first detector 200. Consequently, when the display portion has the large pattern, the display portion can be recognized not to be the target gradation-converted by converter 94.

As described above, when the area of the high-frequency portion is larger than the predetermined area, first detector 200 detects the pixel to be gradation-converted by converter 94 such that the pixel to be gradation-converted by converter 94 does not become the target gradation-converted by converter 94.

When acquiring the binary signal from first AND circuit 205, second detector 210 operates using the binary signal such that the display portion is not recognized as the high-frequency portion gradation-converted by converter 94 when the image region brighter than the surroundings is not sufficiently small. Second detector 210 performs the above operation by determining whether the high-frequency portion is less than or equal to the predetermined area. It can be said that second detector 210 is a processor that repeatedly performs the processing of first detector 200.

Second detector 210 includes second vertical counter 211, second vertical determination unit 212, second horizontal counter 213, second horizontal determination unit 214, and second AND circuit 215.

Second vertical counter 211 counts the number of pixels of interest and the number of pixels in a predetermined range in a vertical direction of the pixel of interest, for example, the number of pixels at the black background level from vertical up and down M2 pixels. Second vertical counter 211 counts the number of pixels at the black background level from (2M2+1) pixels. For example, the pixel at the black background level is a pixel at which the signal from first detector 200 is at the low level. A gradation value (for example, the gradation value between the high level and the low level) used to determine the black background level is an example of the third threshold M2 is an integer of 1 or more. The pixel of interest is a pixel at a high level (for example, the gradation value of 1) in the image based on the binary signal from first detector 200.

Second vertical determination unit 212 determines whether the number of pixels at the black background level counted by second vertical counter 211 is greater than or equal to a third proportion. For example, second vertical determination unit 212 determines whether the number of pixels at the black background level is greater than or equal to 50% of (2M2+1) pixels. The third proportion is not limited to 50%.

Second horizontal counter 213 counts the number of pixels of interest and the number of pixels in a predetermined range in a horizontal direction of the pixel of interest, for example, the number of pixels at the black background level from horizontal left and right N2 pixels. Second horizontal counter 213 counts the number of pixels at the black background level from (2N2+1) pixels. A gradation value (for example, the gradation value between the high level and the low level) used to determine the black background level is an example of the third threshold. N2 is an integer of 1 or more. N2 may be the same value as M2.

Second horizontal determination unit 214 determines whether the number of pixels at the black background level counted by second horizontal counter 213 is greater than or equal to a fourth proportion. For example, second horizontal determination unit 214 determines whether the number of pixels at the black background level is greater than or equal to 50% of (2N2+1) pixels. The fourth proportion is not limited to 50%.

Second AND circuit 215 outputs the signal indicating whether to recognize the pixel of interest as the high-frequency portion to converter 94 based on the determination result of second vertical determination unit 212 and the determination result of second horizontal determination unit 214. When second AND circuit 215 acquires the determination result indicating that the number of pixels at the black background level is greater than or equal to the third proportion from second vertical determination unit 212 while acquiring the number of pixels at the black background level is greater than or equal to the fourth proportion from second horizontal determination unit 214, second AND circuit 215 outputs the signal indicating that the pixel of interest is the pixel recognized as the high-frequency portion to converter 94. That is, the pixel of interest is gradation-converted by converter 94.

For example, second AND circuit 215 calculates a logical product of the signal from second vertical determination unit 212 and the signal from second horizontal determination unit 214. When acquiring the high-level signal indicating that the number of pixels at the black background level is greater than or equal to the second predetermined proportion from both second vertical determination unit 212 and second horizontal determination unit 214, second AND circuit 215 detects the pixel of interest as the black background, and outputs the high-level signal to converter 94. The pixel of interest detected as the black background is a pixel to be gradation-converted by converter 94. For example the high-level signal may be a signal indicating that the gradation value is 1. For example, the second predetermined proportion indicates the case where the third proportion and the fourth proportion are the same.

When acquiring the low-level signal indicating that the number of pixels at the black background level is less than the second predetermined proportion from at least one of second vertical determination unit 212 and second horizontal determination unit 214, second AND circuit 215 outputs the low-level signal to converter 94. For example, the low-level signal may be a signal indicating that the gradation value is less than or equal to the black background level. The binary signal of the high-level or low-level signal output from second AND circuit 215 is an example of the determination signal.

In the second exemplary embodiment, when the number of pixels at the vertical black background level is greater than or equal to M2+1, and when the number of pixels at the horizontal black background level is greater than or equal to N2+1, second detector 210 detects the pixel of interest as the pixel to be gradation-converted by converter 94 and as the black background.

For example, in the image having the pattern of the display portion in FIGS. 12A and 12B, the detection result of second detector 210 is identical to the detection result of first detector 200. For example, in the example of FIG. 12A, the determination signal output from second AND circuit 215 is the signal in which the determination signal of the display portion in part (a) of FIG. 12A is the high level. For example, in the example of FIG. 12B, the determination signal output from second AND circuit 215 is the signal in which the determination signal of the display portion in part (a) of FIG. 12B is the low level.

Figure 13:
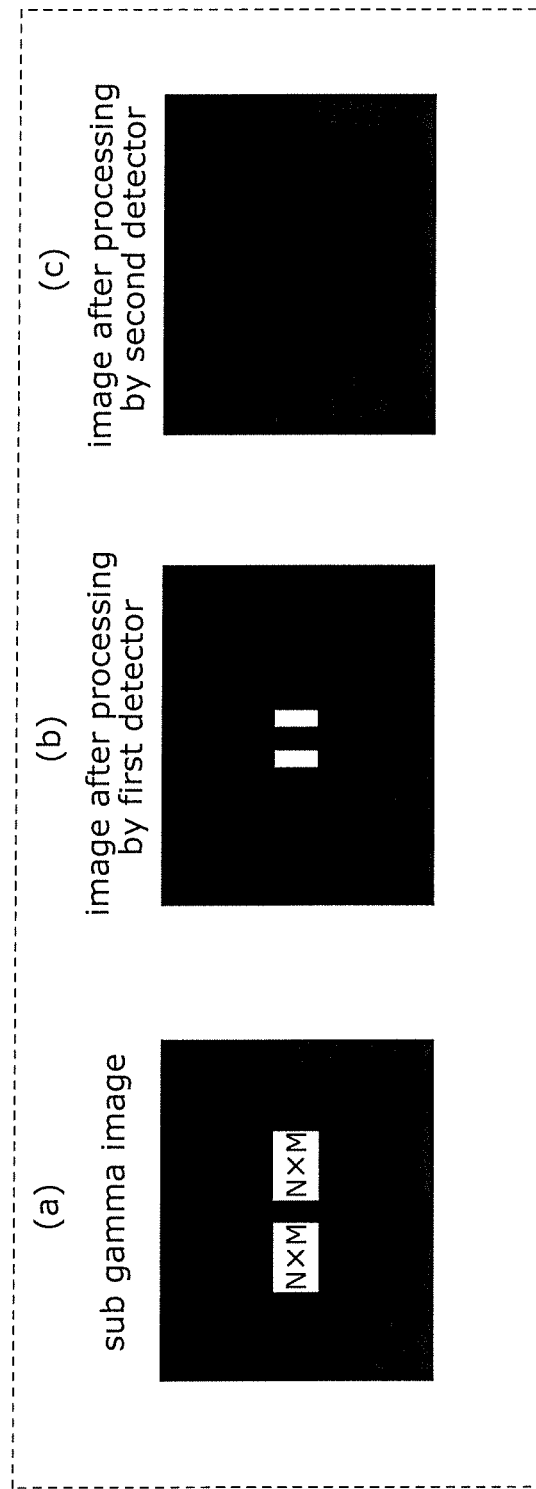
FIG. 13 is a view illustrating processing of a second detector of second exemplary embodiment.

The action that detector 190 includes second detector 210 will be described below with reference to FIG. 13. FIG. 13 is a view illustrating processing of second detector 210 of the second exemplary embodiment. When the black background detection range is ((2N+1)×(2M+1)) pixels, the pattern of (N×M) pixels or less is detected as the black background by first detector 200. However, when the pattern of (N×M) pixels or less is continuously displayed as illustrated in part (a) of FIG. 13, in one-time black background detection performed by first detector 200, as illustrated in part (b) of FIG. 13, all the patterns are not detected as the black background, but remain as unevenness. The pixels that are not detected as the black background are not gradation-converted by converter 94.

For this reason, as illustrated in part (c) of FIG. 13, the pattern smaller than (N×M) pixels can more reliably be detected as the black background by performing the processing of detecting the black background detection using second detector 210.

Converter 94 performs conversion to decrease the gradation value of the pixel in which the high-level signal is acquired from detector 190 in the second gamma correction signal. In the second exemplary embodiment, converter 94 performs the conversion to decrease the gradation value on the high-frequency portion in which the display portion is determined to be less than or equal to the predetermined area by detector 190. The conversion processing is the same as that of converter 94 of the first embodiment, and the description will be omitted.

For example, each component included in image processor 180 is formed of a dedicated circuit. However, the component may be formed of a processor or the like.

Figure 14:
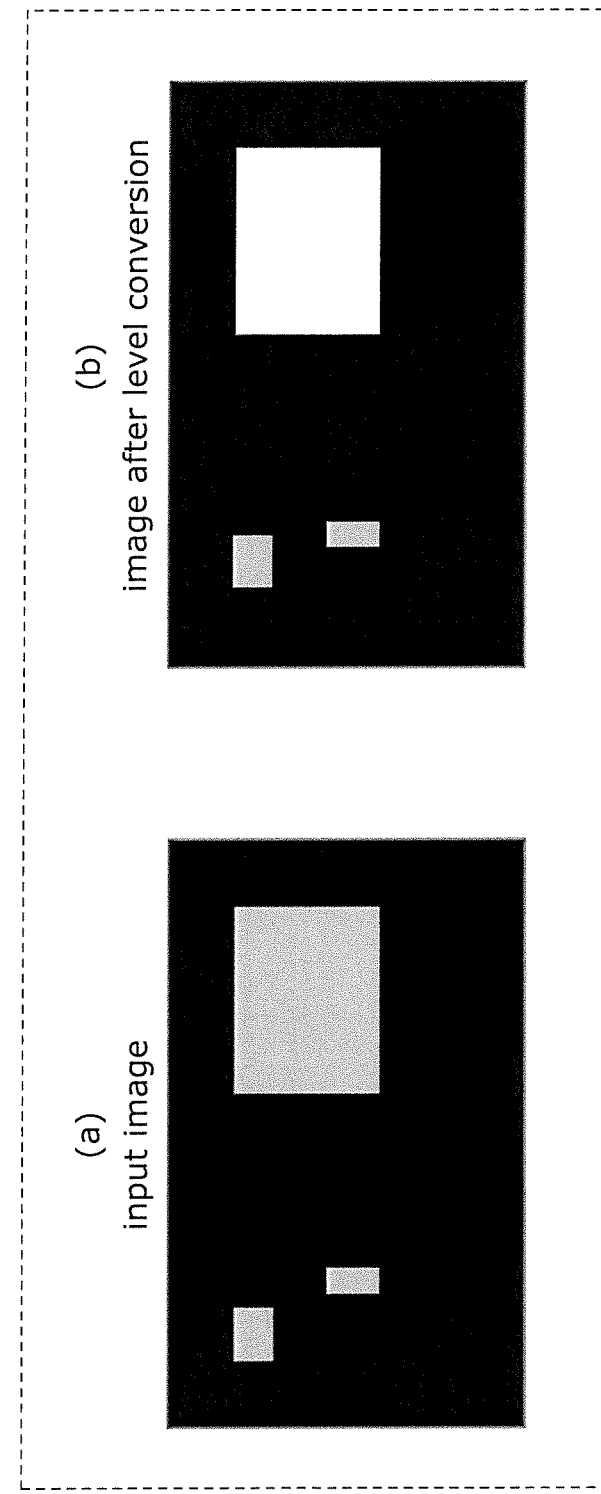
FIG. 14 is a view illustrating an example of an image displayed on a second liquid crystal panel of the second exemplary embodiment.

In the liquid crystal display device including detector 190, the image output from converter 94 will be described with reference to FIG. 14. FIG. 14 is a view illustrating an example of the image displayed on second liquid crystal panel 30 of the second exemplary embodiment. Part (b) of FIG. 14 illustrates an example of the level-converted image output from converter 94 when the input image in part (a) of FIG. 14 is input.

As illustrated in parts (a) and (b) of FIG. 14, when the display portion has the small area, the gradation value of the pixel of the display portion decreases from the sub gamma image by the gradation conversion of converter 94, so that the display portion is darkened. For example, the gradation value of the level-converted image in the portion in which the display portion has the small area becomes the gradation value of the display portion of the input image. When the display portion has the large area, because the gradation conversion of converter 94 is not performed, the gradation value of the level-converted image in the display portion remains at the gradation value of the sub gamma image. For example, the gradation value of the level-converted image in the portion in which the display portion has the large area is larger than the gradation value in the display portion of the input image. For example, the gradation value of the level-converted image in the portion in which the display portion has the large area is larger than the gradation value in the portion in which the display portion of the level-converted image has the small area.

2-2. Operation of Liquid Crystal Display Device

Figure 15:
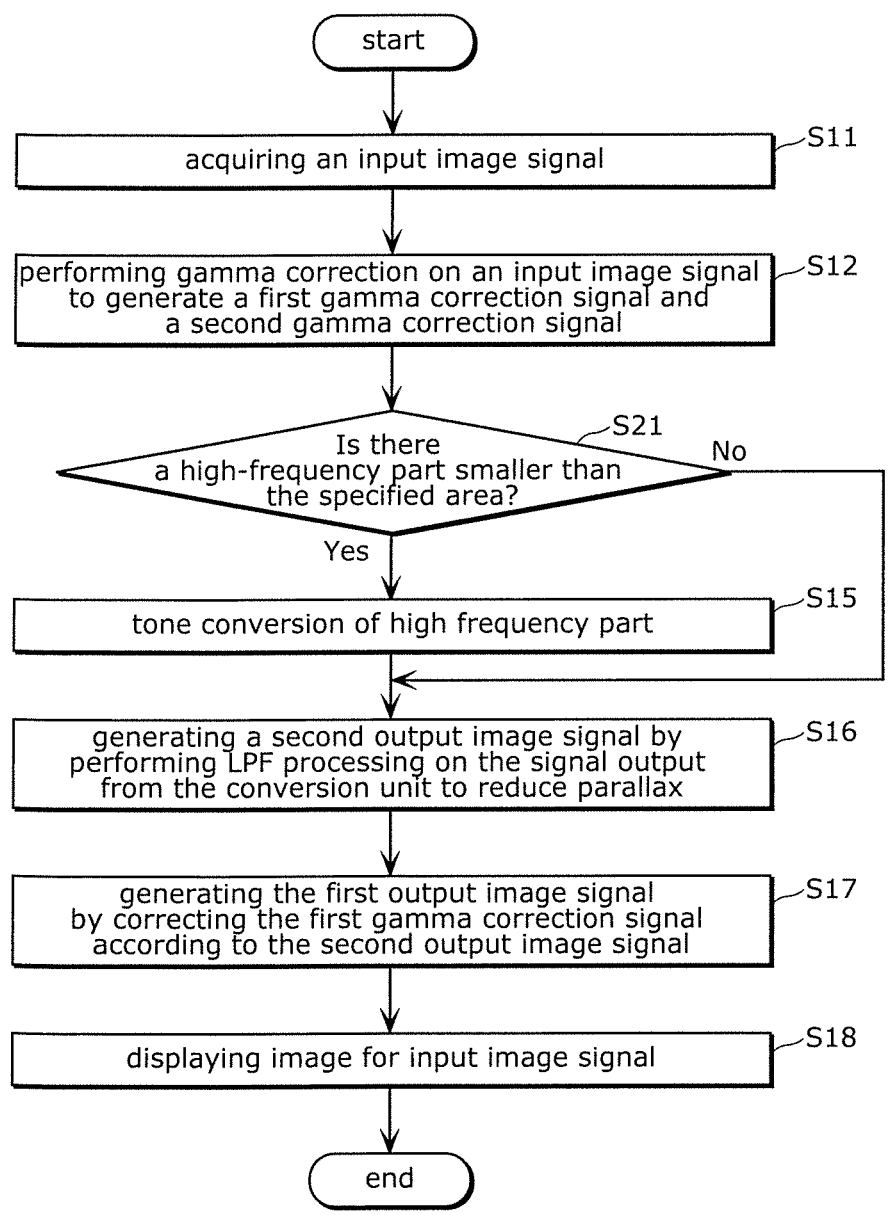
FIG. 15 is a flowchart illustrating operation of the liquid crystal display device of the second exemplary embodiment.

Operation of the liquid crystal display device will be described below with reference to FIG. 15. FIG. 15 is a flowchart illustrating the operation of the liquid crystal display device of the second exemplary embodiment. The flowchart in FIG. 15 includes step S21 instead of step S14 of the flowchart in FIG. 7 of the first exemplary embodiment. The processing in step S13 of the flowchart in FIG. 7 of the first embodiment is not performed in the flowchart in FIG. 15.

As illustrated in FIG. 15, image processor 180 acquires input image signal Data (S11), performs the gamma correction on acquired input image signal Data to generate the first gamma correction signal and the second gamma correction signal (S12), and determines whether the high-frequency portion having the predetermined area or less exists in the second gamma correction signal (S21). Specifically, detector 190 makes the determination according to the number of pixels at the vertical and horizontal black background levels of the pixel of interest. When the high-frequency portion having the predetermined area or less exists (Yes in S21), detector 190 sets the determination signal for the pixels constituting the high-frequency portion to the high level. Converter 94 performs the gradation conversion on the high-frequency portion in which the high-level determination signal is acquired (S15). Converter 94 performs the gradation conversion to decrease the gradation value of only the high-frequency portion having the predetermined area or less when the high-frequency portion having the predetermined area or less and the high-frequency part having the larger area than the predetermined area are mixed in the sub gamma image.

When the high-frequency portion having the predetermined area or less does not exist (No in S21), for example, when the high-frequency portion larger than the predetermined area exists, detector 190 sets the determination signal for the pixels constituting the high-frequency portion to the low level. Converter 94 does not perform the gradation conversion on the high-frequency portion in which the low-level determination signal is acquired. Consequently, the gradation values of the pixels constituting the high-frequency portion larger than the predetermined area are not converted, so that the high-frequency portion can be prevented from becoming the luminance unevenness due to the gradation conversion performed by converter 94.

The pieces of processing after step S16 are the same as those after step S16 in FIG. 7, and the description will be omitted.

As described above, detector 190 of image processor 180 includes first detector 200 that detects whether the first high-frequency portion has the predetermined area or less. Converter 94 performs the correction to decrease the gradation value on the first high-frequency portion determined to be less than or equal to the predetermined area by detector 190.

Consequently, converter 94 performs the gradation conversion only on the high-frequency portion having the predetermined area or less. In other words, converter 94 does not perform the gradation conversion on the high-frequency portion larger than the predetermined area. That is, because the high-frequency portion has the large area, the gradation conversion is not performed on the high-frequency portion in which possibly converter 94 cannot correctly perform the gradation conversion. Thus, image processor 180 can prevent the generation of the luminance unevenness due to the gradation conversion performed by converter 94.

First detector 200 counts the number of pixels having the gradation value less than or equal to the second threshold less than the first threshold in each of the vertical M1 (M1 is an integer of 1 or more) pixels and the horizontal N1 (N1 is an integer 1 or more) pixels for each pixel having the gradation value greater than or equal to the first threshold in the plurality of pixels constituting the image based on the second gamma correction signal. When the proportion of the number of counted pixels is greater than or equal to the first predetermined proportion, first detector 200 detects the pixel as the pixel to be corrected by converter 94.

Consequently, first detector 200 can determine whether the area of the high-frequency portion is less than or equal to the predetermined area only by counting the number of pixels having the gradation value less than or equal to the first threshold.

First detector 200 outputs the binary signal indicating whether the number of counted pixels is greater than or equal to the first predetermined proportion for each pixel having the gradation value greater than or equal to the first threshold. Image processor 180 includes second detector 210 that counts the number of pixels having the gradation value less than or equal to the third threshold in each of the vertical M2 (M2 is an integer of 1 or more) pixels and the horizontal N2 (N2 is an integer 1 or more) pixels for each of the plurality of pixels constituting the image based on the binary signal. When the proportion of the number of counted pixels is greater than or equal to the second predetermined proportion, second detector 210 detects the pixel as the pixel to be corrected by converter 94.

Consequently, even when the display patterns of (N×M) pixels or less are continuously displayed on the image, detector 190 more certainly detects the display pattern to be gradation-converted by converter 94. Thus, image processor 180 can further prevent the generation of the luminance unevenness due to the gradation conversion performed by converter 94.

Third Exemplary Embodiment

Figure 16:
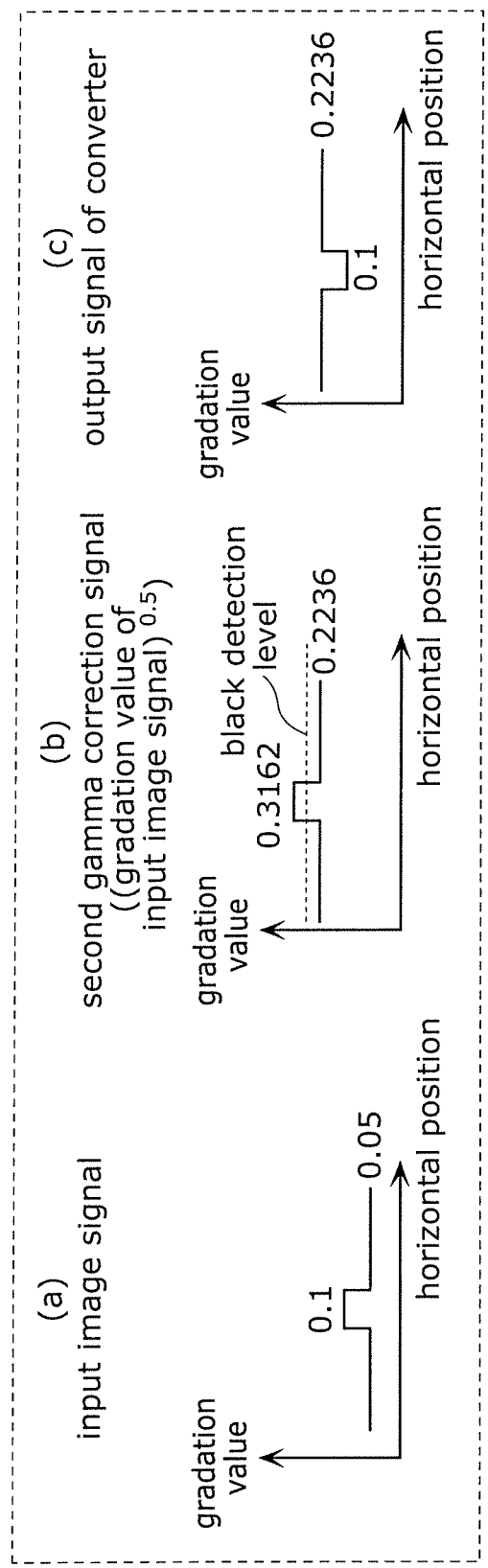
FIG. 16 is a view illustrating a problem to be solved in a liquid crystal display device according to a third exemplary embodiment.

A liquid crystal display device according to a third exemplary embodiment will be described below with reference to FIGS. 16 to 17. A problem to be solved in the liquid crystal display device of the third exemplary embodiment will be described with reference to FIG. 16. FIG. 16 is a view illustrating the problem to be solved in the liquid crystal display device of the third exemplary embodiment; and Specifically, part (a) of FIG. 16 illustrates input image signal Data, part (b) of FIG. 16 illustrates the second gamma correction signal, and part (c) of FIG. 16 illustrates the output signal of converter 94. In the following description, it is assumed that second gamma corrector 92 has gamma value r2 of 0.5.

As illustrated in part (a) of FIG. 16, it is assumed that the signal having the gradation values 0.05 and 0.1 is input as input image signal Data. The gradation value of 0.1 indicates that the gradation value of 0.1 is brighter than the gradation value of 0.05.

Second gamma corrector 92 calculates the gradation value indicated by the gamma-corrected second gamma correction signal using the following equation 5.

$$\text{correction value} = (\text{gradation value of input image signal})^{r2} \quad \text{(equation 5)}$$

Second gamma corrector 92 generates the second gamma correction signal illustrated in part (b) of FIG. 16 by calculating the correction value using the equation 5. At this point, when the black detection level is a value between the gradation values 0.2236 and 0.3162 (for example, 0.25), the detector detects the pixel (the pixel of the high-frequency portion) having the gradation value of 0.3162 as the target to be gradation-converted by converter 94. Converter 94 calculates the gradation-converted gradation value of the pixel in the high-frequency portion using the equation 4. As a result, as illustrated in part (c) of FIG. 16, the gradation value of the pixel in the high-frequency portion becomes 0.1. That is, the gradation-converted gradation value of the pixel in the high-frequency portion is the same as the gradation value of input image signal Data.

At this point, as can be seen from part (a) of FIG. 16 and part (c) of FIG. 16, a light-dark relationship between the high-frequency portion and the portion except for the high-frequency portion is reversed. This remains as the parallax, which leads to the degradation of the image quality. Such a phenomenon can be generated when the black detection level is set to the high gradation value while the gradation value of the image region (high-frequency portion) brighter than the surroundings is close to the black detection level.

The liquid crystal display device including the image processor that can prevent the inversion of the light-dark relationship in input image signal Data and the light-dark relationship in the signal output from converter 94 will be described in the third exemplary embodiment.

3-1. Configuration of Liquid Crystal Display Device

The liquid crystal display device of the third exemplary embodiment will be described below with reference to FIG. 17. FIG. 17 is a block diagram illustrating some functional configurations of image processor 380 of the third exemplary embodiment. Specifically, FIG. 17 is a block diagram illustrating a functional configuration corresponding to the portion indicated by the alternate long and short dash line in FIG. 4 in the configuration of image processor 380.

Figure 17:
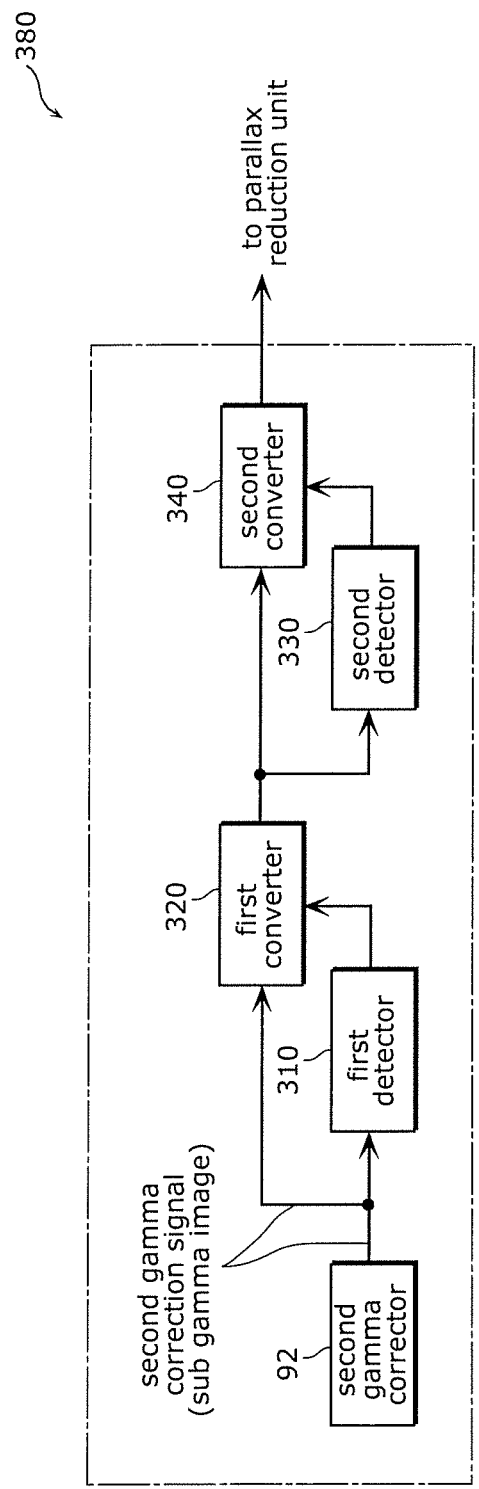
FIG. 17 is a block diagram illustrating some functional configurations of an image processor of the third exemplary embodiment.

As illustrated in FIG. 17, image processor 380 includes first detector 310 and second detector 330 instead of detector 93 of image processor 80 in FIG. 4 and first converter 320 and second converter 340 instead of converter 94. First detector 310, first converter 320, second detector 330, and second converter 340 are included in the sub-side image processor.

First detector 310 detects a pixel having a first black level or less as the black background in the sub gamma image. The gradation value of the first black level is not particularly limited. For example, the gradation value of the first black level is 0.25. For example, first detector 310 is formed of first detector 200 or detector 190 of the second exemplary embodiment. For example, the gradation value of the first black level is the second threshold.

First converter 320 is a circuit that converts the portion (high-frequency portion) brighter than the region where black is detected at the first black level into the larger one among the conversion value (gradation value) given by the equation 3 and the first black level. First converter 320 converts the gradation value of the pixel in the sub gamma image into larger one among the conversion value and the first black level, and outputs the larger value.

In the image output from first converter 320, second detector 330 detects the pixel less than or equal to the second black level as the black background. The gradation value of the second black level is not particularly limited as long as the gradation value of the second black level is smaller than the gradation value of the first black level. For example, the gradation value of the second black level is 0.05. For example, second detector 330 is formed of first detector 200 or detector 190 of the second exemplary embodiment. For example, the gradation value of the second black level is the third threshold.

Second converter 340 is a circuit that converts the portion (high-frequency portion) brighter than the region where black is detected at the second black level into the larger one among the conversion value (gradation value) given by the equation 3 and the second black level. Second converter 340 converts the gradation value of the pixel in the image output from first converter 320 into larger one among the conversion value and the second black level, and outputs the larger value. The signal output from second converter 340 is input to parallax reduction unit 95.

Assuming that one stage is the set of the detector and the converter, image processor 380 includes two stages of the detector and the converter. Alternatively, image processor 380 may include a set of at least three stages of the detector and the converter. In this case, in the flow of the signal from second gamma corrector 92 to parallax reduction unit 95, the gradation value at the black background level of the detector becomes smaller as the detector is disposed closer to parallax reduction unit 95. As described above, because image processor 380 includes the plurality of sets of the detector and the converter, the gradation difference between the black background portion and the bright portion is decreased to increase the parallax reduction ability.

As described above, image processor 380 further includes second detector 330 that detects the image region brighter than the surroundings as the second high-frequency portion from the gamma correction signals corrected by first converter 320 and second converter 340 that performs the correction to decrease the gradation value of the second high-frequency portion. Second detector 330 counts the number of pixels having the gradation value less than or equal to the third threshold in the vertical M2 (M2 is an integer of 1 or more) pixels and the horizontal N2 (N2 is an integer 1 or more) pixels for each of the plurality of pixels constituting the image based on the signal corrected by first converter 320. When the proportion of the number of counted pixels is greater than or equal to the second predetermined proportion, second detector 330 detects the pixel as the pixel to be corrected by second converter 340. The third threshold is a value smaller than the second threshold.

Image processor 380 is an example of the image processing device, first converter 320 is an example of the second corrector, and second converter 340 is an example of the third corrector.

Consequently, image processor 380 can prevent the reversal of the light-dark relationship in the input image based on input image signal Data and the light-dark relationship in the second image displayed on second liquid crystal panel 30. Thus, image processor 380 can display the image in which the parallax is reduced.

Image processor 380 further includes parallax reduction unit 95 that receives the signal output from second converter 340, performs the smoothing processing on the signal, and generates second output image signal DAT2.

Second converter 340 is an example of the third corrector.

Consequently, image processor 380 can prevent the halo, the double image, or the like from being visually recognized without changing the filter size of parallax reduction unit 95. That is, image processor 380 reduces the filter size of parallax reduction unit 95 to prevent the halo or the like, which allows the prevention of the generation of the picture lacking. Thus, image processor 380 can achieve the compatibility between the prevention of the halo or the like and the prevention of the picture lacking.

Other Exemplary Embodiments

Although the liquid crystal display devices of each embodiment and modification (hereinafter, also referred to as the embodiments and the like, are described above, the present disclosure is not limited to the embodiments.

In the embodiments and the like, by way of example, the liquid crystal display device includes two liquid crystal panels. However, the present disclosure is not limited thereto. For example, the liquid crystal display device may include three or more liquid crystal panels.

In the embodiments and the like, the glass substrate is used as the pair of first transparent substrates and the pair of second transparent substrates. However, the present disclosure is not limited thereto, and a transparent resin substrate or the like may be used.

Division of the functional blocks in the block diagram is by way of example, and a plurality of functional blocks may be implemented as one functional block, a single functional block may be divided into the plurality of functional blocks, or some functions may be transferred to another functional block. The functions of the plurality of functional blocks having similar functions may be processed in parallel or in a time-division manner by single hardware or software.

In the embodiments and the like, each component may be constructed with dedicated hardware, or implemented by executing a software program suitable for each component. Each component may be implemented by causing a program execution unit such as a processor to read and execute a software program recorded in a recording medium such as a hard disk and a semiconductor memory. The processor is configured with one or a plurality of electronic circuits including a semiconductor integrated circuit (IC) or a Large Scale Integration (LSI). The plurality of electronic circuits may be integrated in one chip, or provided in a plurality of chips. A plurality of chips may be integrated in one device, or provided in a plurality of devices.

The order of the plurality of pieces of processing described in the embodiments and the like is an example. The order of the plurality of pieces of processing may be changed, or the plurality of pieces of processing may be performed in parallel.

Those skilled in the art will readily appreciate that many modifications are possible in the above exemplary embodiment and variations without materially departing from the novel teachings and advantages of the present disclosure. Accordingly, all such modifications are intended to be included within the scope of the present disclosure.

What is claimed is:

1. An image processing device that generates a second output image signal output to a second liquid crystal panel of a liquid crystal display device including a first liquid crystal panel and the second liquid crystal panel that is disposed to be superposed on the first liquid crystal panel, the image processing device comprising:
- a first corrector that generates a gamma correction signal in which a gradation value of an input image signal is corrected;
- a detector that receives the gamma correction signal and detects an image region brighter than surroundings as a first high-frequency portion from the gamma correction signal; and
- a second corrector that receives the gamma correction signal and a detection result of the detector and performs correction to decrease the gradation value of the first high-frequency portion in the gamma correction signal,
- wherein the second output image signal is generated based on the gamma correction signal corrected by the second corrector,
- the detector includes a first detector that detects whether the first high-frequency portion is less than or equal to a predetermined area,
- the second corrector performs the correction to decrease the gradation value on the first high-frequency portion determined to be less than or equal to the predetermined area by the detector, and
- the first detector counts a number of pixels having the gradation value less than or equal to a second threshold less than a first threshold in each of vertical M1 (M1 is an integer of 1 or more) pixels and horizontal N1 (N1 is an integer 1 or more) pixels for each pixel having the gradation value greater than or equal to the first threshold in a plurality of pixels constituting an image based on the gamma correction signal, and detects the pixel as a pixel to be corrected by the second corrector when a proportion of the number of counted pixels is greater than or equal to a first predetermined proportion.

2. The image processing device according to claim 1, wherein the second corrector corrects the gradation value of the first high-frequency portion to the gradation value of the first high-frequency portion in the input image signal.

3. The image processing device according to claim 1, wherein the detector includes:
- a low-pass filter that receives the gamma correction signal and generates a processing signal by performing low-pass filtering processing on the gamma correction signal; and
- a determination unit that receives the gamma correction signal and the processing signal and determines the first high-frequency portion based on the gamma correction signal and the processing signal.

4. The image processing device according to claim 3, wherein the determination unit determines whether a first gradation value indicated by the gamma correction signal is higher than a second gradation value indicated by the processing signal for each of a plurality of pixels, and determines that at least one pixel having the first gradation value higher than the second gradation value is the first high-frequency portion.

5. The image processing device according to claim 1, further comprising a second detector that counts a number of pixels having the gradation value less than or equal to a third threshold in each of vertical M2 (M2 is an integer of 1 or more) pixels and horizontal N2 (N2 is an integer 1 or more) pixels for each of the plurality of pixels constituting an image based on a binary signal indicating whether the number of counted pixels is greater than or equal to the first predetermined proportion, and detects the pixel as a pixel to be corrected by the second corrector when a proportion of the number of counted pixels is greater than or equal to a second predetermined proportion,
wherein the first detector outputs the binary signal for each pixel having the gradation value greater than or equal to the first threshold.

6. The image processing device according to claim 1, further comprising:
- a second detector that detects the image region brighter than the surroundings as a second high-frequency portion from the gamma correction signal corrected by the second corrector; and
- a third corrector that performs correction to decrease the gradation value of the second high-frequency portion,
- wherein the second detector counts a number of pixels having the gradation value less than or equal to a third threshold in vertical M2 (M2 is an integer of 1 or more) pixels and horizontal N2 (N2 is an integer 1 or more) pixels for each of the plurality of pixels constituting an image based on a binary signal indicating whether the number of counted pixels is greater than or equal to the first predetermined proportion, and detects the pixel as a pixel to be corrected by the third corrector when a proportion of the counted pixels is greater than or equal to a second predetermined proportion,
- wherein the third threshold is a value smaller than the second threshold.

7. The image processing device according to claim 1, further comprising a parallax reduction unit that receives a signal from the second corrector, performs smoothing processing on the signal, and generates the second output image signal.

8. The image processing device according to claim 6, further comprising a parallax reduction unit that receives a signal from the third corrector, performs the smoothing processing on the signal, and generates the second output image signal.

9. The image processing device according to claim 1, further comprising a fourth corrector that receives at least the second output image signal and generates a first output image signal output to the first liquid crystal panel based on the at least the second output image signal.

10. The image processing device according to claim 9, wherein the fourth corrector also receives the gamma correction signal, and
the fourth corrector includes:
- a division processor that calculates a correction value based on the gamma correction signal and the second output image signal; and
- a multiplier that generates the first output image signal based on the correction value and a signal based on the input image signal.

11. A liquid crystal display device comprising:
the image processing device according to claim 1; and
the second liquid crystal panel to which the second output image signal generated by the image processing device is input.

12. The liquid crystal display device according to claim 11, further comprising the first liquid crystal panel that displays a color image,
wherein the second liquid crystal panel is disposed on a back surface side of the first liquid crystal panel and displays a monochrome image.

* * * * *